US012065989B2

(12) United States Patent
Ostdiek et al.

(10) Patent No.: US 12,065,989 B2
(45) Date of Patent: *Aug. 20, 2024

(54) GAS TURBINE ENGINE WITH THIRD STREAM

(71) Applicant: General Electric Company, Schenectady, NY (US)

(72) Inventors: David Marion Ostdiek, Liberty Township, OH (US); William Joseph Solomon, Montgomery, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,292

(22) Filed: Oct. 31, 2022

(65) Prior Publication Data

US 2023/0323837 A1 Oct. 12, 2023

Related U.S. Application Data

(63) Continuation-in-part of application No. 17/717,462, filed on Apr. 11, 2022.

(51) Int. Cl.
*B64C 11/48* (2006.01)
*F02K 3/06* (2006.01)
(Continued)

(52) U.S. Cl.
CPC .............. *F02K 3/06* (2013.01); *B64C 11/001* (2013.01); *B64C 11/18* (2013.01); *B64C 11/48* (2013.01);
(Continued)

(58) Field of Classification Search
CPC . F02K 3/072; F02K 3/06; F02K 3/062; F02K 3/065; F02C 7/36; F02C 3/107;
(Continued)

(56) References Cited

U.S. PATENT DOCUMENTS 2,999,630 A 9/1961 Warren et al.
3,540,682 A 11/1970 Dibble et al.
(Continued)

FOREIGN PATENT DOCUMENTS

CN 1204005 A 1/1999
CN 101657607 A 2/2010
(Continued)

OTHER PUBLICATIONS

Crigler, Application of Theodorsen's Theory to Propeller Design, NACA (National Advisory Committee for Aeronautics) Report 924, 1948, pp. 83-99.
(Continued)

*Primary Examiner* — Justin D Seabe
*Assistant Examiner* — Behnoush Haghighian
(74) *Attorney, Agent, or Firm* — Dority & Manning, P.A.

(57) ABSTRACT

A gas turbine is provided, the gas turbine engine including a turbomachine having an inlet splitter defining in part an inlet to a working gas flowpath and a fan duct splitter defining in part an inlet to a fan duct flowpath. The gas turbine engine also includes a primary fan driven by the turbomachine defining a primary fan tip radius R1, a primary fan hub radius R2, and a primary fan specific thrust rating TP; and a secondary fan downstream of the primary fan and driven by the turbomachine, the secondary fan defining a secondary fan tip radius R3, a secondary fan hub radius R4, and a secondary fan specific thrust rating TS; wherein the gas turbine engine defines an Effective Bypass Area, and wherein a ratio of R1 to R3 equals $$\frac{R_1}{R_3} = \sqrt{(EFP)\frac{\left(1-RqR_{Sec.-Fan}^2\right)}{\left(1-RqR_{Prim.-Fan}^2\right)}\left(\frac{T_P}{T_S}\right)(EBA)}.$$

19 Claims, 15 Drawing Sheets

(51) Int. Cl.

| | |
|---|---|
| B64C 11/00 | (2006.01) |
| B64C 11/18 | (2006.01) |
| F01D 9/02 | (2006.01) |
| F01D 17/10 | (2006.01) |
| F01D 17/14 | (2006.01) |
| F02C 7/36 | (2006.01) |
| F02K 3/065 | (2006.01) |
| F02K 3/072 | (2006.01) |
| F04D 19/02 | (2006.01) |
| F04D 29/34 | (2006.01) |
| F04D 29/38 | (2006.01) |

(52) U.S. Cl.
CPC .............. F01D 9/02 (2013.01); F01D 17/105 (2013.01); F01D 17/14 (2013.01); F02C 7/36 (2013.01); F02K 3/065 (2013.01); F02K 3/072 (2013.01); F04D 19/02 (2013.01); F04D 29/34 (2013.01); F04D 29/388 (2013.01); F05D 2200/14 (2013.01); F05D 2200/211 (2013.01); F05D 2220/323 (2013.01)

(58) Field of Classification Search
CPC .......... F02C 3/113; F02C 3/067; F02C 3/073; F04D 19/024; F04D 19/022; F04D 19/02; F04D 19/002; F04D 19/007; F04D 29/388; F04D 29/384; F04D 29/34; F05D 2220/36; F05D 2270/051; B64D 2027/005; B64D 2033/0286; B64D 2033/0293; B64D 35/04; B64D 35/06; B64C 27/08
See application file for complete search history.

(56) References Cited

U.S. PATENT DOCUMENTS

| | | | |
|---|---|---|---|
| 3,542,152 A | 11/1970 | Adamson et al. | |
| 3,750,402 A | 8/1973 | Vdoviak et al. | |
| 4,010,608 A | 3/1977 | Simmons | |
| 4,043,121 A | 8/1977 | Thomas et al. | |
| 4,446,696 A | 5/1984 | Sargisson et al. | |
| 4,486,146 A | 12/1984 | Campion | |
| 4,569,199 A | 2/1986 | Klees et al. | |
| 4,607,657 A | 8/1986 | Hirschkron | |
| 4,784,575 A | 11/1988 | Nelson et al. | |
| 4,860,537 A | 8/1989 | Taylor | |
| 4,892,269 A | 1/1990 | Greco et al. | |
| 4,907,946 A | 3/1990 | Ciokajlo et al. | |
| 4,916,894 A | 4/1990 | Adamson et al. | |
| 4,976,102 A | 12/1990 | Taylor | |
| 5,054,998 A | 10/1991 | Davenport | |
| 5,190,441 A | 3/1993 | Murphy et al. | |
| 5,197,855 A | 3/1993 | Magliozzi et al. | |
| 5,259,187 A | 11/1993 | Dunbar et al. | |
| 5,261,227 A | 11/1993 | Giffin, III | |
| 5,345,760 A | 9/1994 | Giffin, III | |
| 5,457,346 A | 10/1995 | Blumberg et al. | |
| 5,867,979 A | 2/1999 | Newton et al. | |
| 5,950,308 A | 9/1999 | Koff et al. | |
| 6,339,927 B1 | 1/2002 | DiPietro, Jr. | |
| 6,547,518 B1 | 4/2003 | Czachor et al. | |
| 6,763,654 B2 | 7/2004 | Orlando et al. | |
| 6,792,758 B2 | 9/2004 | Dowman | |
| 7,559,191 B2 | 7/2009 | Parks | |
| 7,762,766 B2 | 7/2010 | Shteyman et al. | |
| 8,276,392 B2 | 10/2012 | van Der Woude | |
| 8,382,430 B2 | 2/2013 | Parry et al. | |
| 8,459,035 B2 | 6/2013 | Smith et al. | |
| 8,689,538 B2 | 4/2014 | Sankrithi et al. | |
| 8,762,766 B2 | 6/2014 | Ferguson et al. | |
| 8,876,465 B2 | 11/2014 | Stretton | |
| 8,910,465 B2 | 12/2014 | Snyder | |
| 8,943,796 B2 | 2/2015 | McCaffrey | |
| 8,967,967 B2 | 3/2015 | Stretton et al. | |
| 9,045,996 B2 | 6/2015 | Anghel et al. | |
| 9,057,328 B2 | 6/2015 | Kupratis | |
| 9,096,312 B2 | 8/2015 | Moxon | |
| 9,097,134 B2 | 8/2015 | Ferch et al. | |
| 9,200,531 B2 * | 12/2015 | Robertson, Jr. ........ F01D 11/125 |
| 9,534,538 B1 | 1/2017 | Cerny | |
| 9,982,555 B2 | 5/2018 | Thet et al. | |
| 9,995,314 B2 | 6/2018 | Miller et al. | |
| 10,047,702 B2 * | 8/2018 | Sabnis ...................... F02K 1/52 |
| 10,077,660 B2 | 9/2018 | Hoefer et al. | |
| 10,090,676 B2 | 10/2018 | Knowles et al. | |
| 10,126,062 B2 | 11/2018 | Cerny et al. | |
| 10,184,400 B2 | 1/2019 | Cerny et al. | |
| 10,202,865 B2 | 2/2019 | Breeze-Stringfellow et al. | |
| 10,252,810 B2 | 4/2019 | Niergarth et al. | |
| 10,253,648 B2 | 4/2019 | Bentley et al. | |
| 10,260,419 B2 | 4/2019 | Cerny et al. | |
| 10,263,550 B2 | 4/2019 | Thet et al. | |
| 10,344,674 B2 | 7/2019 | Cerny et al. | |
| 10,364,750 B2 | 7/2019 | Rambo | |
| 10,392,120 B2 | 8/2019 | Niergarth et al. | |
| 10,443,436 B2 | 10/2019 | Miller et al. | |
| 10,487,739 B2 | 11/2019 | Miller et al. | |
| 10,644,630 B2 | 5/2020 | Smith et al. | |
| 10,648,475 B1 * | 5/2020 | Stretton ................ F04D 19/002 |
| 2004/0197187 A1 | 10/2004 | Usab et al. | |
| 2004/0234372 A1 | 11/2004 | Shahpar | |
| 2005/0109012 A1 | 5/2005 | Johnson | |
| 2005/0241292 A1 | 11/2005 | Taylor et al. | |
| 2007/0186535 A1 | 8/2007 | Powell et al. | |
| 2007/0251212 A1 | 11/2007 | Tester | |
| 2009/0078819 A1 | 3/2009 | Guering et al. | |
| 2010/0014977 A1 | 1/2010 | Shattuck | |
| 2010/0111674 A1 | 5/2010 | Sparks | |
| 2010/0251726 A1 | 10/2010 | Jones et al. | |
| 2010/0326050 A1 | 12/2010 | Schilling et al. | |
| 2010/0329856 A1 | 12/2010 | Hofer et al. | |
| 2011/0150659 A1 | 6/2011 | Micheli et al. | |
| 2011/0192166 A1 | 8/2011 | Mulcaire | |
| 2012/0177493 A1 | 7/2012 | Fabre | |
| 2013/0098050 A1 | 4/2013 | Kupratis | |
| 2013/0104521 A1 | 5/2013 | Kupratis | |
| 2013/0104522 A1 | 5/2013 | Kupratis | |
| 2013/0104560 A1 | 5/2013 | Kupratis | |
| 2013/0195605 A1 * | 8/2013 | Robertson ................ F01D 11/18 |
| | | | 29/889.22 |
| 2014/0133982 A1 | 5/2014 | Dejeu et al. | |
| 2014/0345253 A1 | 11/2014 | Dawson et al. | |
| 2014/0345254 A1 | 11/2014 | Dawson et al. | |
| 2015/0003993 A1 | 1/2015 | Kim et al. | |
| 2015/0098813 A1 | 4/2015 | Jarrett, Jr. | |
| 2015/0284070 A1 | 10/2015 | Breeze-Stringfellow et al. | |
| 2015/0291276 A1 | 10/2015 | Zatorski et al. | |
| 2016/0010487 A1 | 1/2016 | Breeze-Stringfellow et al. | |
| 2016/0160647 A1 | 6/2016 | Hofer et al. | |
| 2016/0230658 A1 | 8/2016 | Hanlon et al. | |
| 2017/0051678 A1 | 2/2017 | Becker, Jr. | |
| 2017/0051680 A1 | 2/2017 | Becker, Jr. et al. | |
| 2017/0102006 A1 | 4/2017 | Miller et al. | |
| 2017/0114721 A1 | 4/2017 | Miller et al. | |
| 2017/0167382 A1 | 6/2017 | Miller et al. | |
| 2017/0184027 A1 | 6/2017 | Moniz et al. | |
| 2017/0198719 A1 | 7/2017 | Cerny et al. | |
| 2017/0297727 A1 | 10/2017 | Niergarth et al. | |
| 2017/0297728 A1 | 10/2017 | Niergarth et al. | |
| 2018/0065727 A1 | 3/2018 | Gruber et al. | |
| 2018/0118364 A1 | 5/2018 | Golshany et al. | |
| 2018/0215475 A1 | 8/2018 | Hurt et al. | |
| 2018/0283795 A1 | 10/2018 | Cerny et al. | |
| 2019/0136710 A1 | 5/2019 | Breeze-Stringfellow et al. | |
| 2019/0153952 A1 | 5/2019 | Niergarth et al. | |
| 2019/0153953 A1 | 5/2019 | Niergarth et al. | |
| 2019/0218971 A1 | 7/2019 | Niergarth et al. | |
| 2019/0249599 A1 | 8/2019 | Sen et al. | |
| 2019/0257247 A1 | 8/2019 | Pal et al. | |
| 2019/0360401 A1 | 11/2019 | Rambo et al. | |
| 2020/0095939 A1 | 3/2020 | Epstein | |
| 2021/0108573 A1 | 4/2021 | Sibbach et al. | |

(56) References Cited

U.S. PATENT DOCUMENTS

| | | |
|---|---|---|
| 2021/0108597 A1 | 4/2021 | Ostdiek et al. |
| 2022/0056811 A1 | 2/2022 | Molesini et al. |
| 2022/0333553 A1 | 10/2022 | Zatorski et al. |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |
| EP | 1493900 A2 | 1/2005 |
| EP | 1988274 A2 | 11/2008 |
| EP | 2540989 A2 | 1/2013 |
| EP | 2562082 A2 | 2/2013 |
| EP | 3093443 A1 | 11/2016 |
| GB | 2100799 A | 1/1983 |
| GB | 2196390 A | 4/1988 |
| GB | 2461811 A | 1/2010 |
| JP | H0370698 A | 3/1991 |
| JP | 2006123880 A | 5/2006 |
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |
| WO | WO2011/094477 A2 | 8/2011 |
| WO | WO2011/107320 A1 | 9/2011 |
| WO | WO2014/143248 A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

\* cited by examiner

| R1/R3 | EBA | TP | TS | RqR_Prim.-Fan | RqR_Sec.-Fan |
|---|---|---|---|---|---|
| 4.99 | 3.5% | 0.12 | 0.38 | 0.25 | 0.60 |
| 5.44 | 2.0% | 0.12 | 0.38 | 0.25 | 0.60 |
| 5.82 | 1.0% | 0.12 | 0.38 | 0.25 | 0.60 |
| 6.67 | 0.2% | 0.12 | 0.38 | 0.25 | 0.60 |
| 3.90 | 6.0% | 0.17 | 0.40 | 0.25 | 0.60 |
| 4.12 | 4.0% | 0.17 | 0.40 | 0.25 | 0.60 |
| 4.40 | 2.0% | 0.17 | 0.40 | 0.25 | 0.60 |
| 5.24 | 0.3% | 0.17 | 0.40 | 0.25 | 0.60 |
| 2.79 | 12.0% | 0.26 | 0.44 | 0.25 | 0.60 |
| 2.92 | 8.5% | 0.26 | 0.44 | 0.25 | 0.60 |
| 3.08 | 5.0% | 0.26 | 0.44 | 0.25 | 0.60 |
| 3.33 | 2.0% | 0.26 | 0.44 | 0.25 | 0.60 |
| 3.53 | 1.0% | 0.26 | 0.44 | 0.25 | 0.60 |
| 3.74 | 0.5% | 0.26 | 0.44 | 0.25 | 0.60 |
| 2.63 | 12.0% | 0.29 | 0.46 | 0.25 | 0.60 |
| 2.74 | 8.5% | 0.29 | 0.46 | 0.25 | 0.60 |
| 2.88 | 5.0% | 0.29 | 0.46 | 0.25 | 0.60 |
| 3.38 | 0.8% | 0.29 | 0.46 | 0.25 | 0.60 |
| 1.49 | 12.0% | 0.29 | 0.30 | 0.25 | 0.60 |
| 1.54 | 8.5% | 0.29 | 0.30 | 0.25 | 0.60 |
| 1.60 | 5.0% | 0.29 | 0.30 | 0.25 | 0.60 |
| 1.73 | 2.0% | 0.29 | 0.30 | 0.25 | 0.60 |
| 1.56 | 12.0% | 0.32 | 0.34 | 0.25 | 0.60 |
| 1.60 | 8.5% | 0.32 | 0.34 | 0.25 | 0.60 |
| 1.68 | 5.0% | 0.32 | 0.34 | 0.25 | 0.60 |
| 1.81 | 2.0% | 0.32 | 0.34 | 0.25 | 0.60 |
| 1.66 | 12.0% | 0.38 | 0.41 | 0.25 | 0.60 |
| 1.71 | 8.5% | 0.38 | 0.41 | 0.25 | 0.60 |
| 1.79 | 5.0% | 0.38 | 0.41 | 0.25 | 0.60 |
| 1.93 | 2.0% | 0.38 | 0.41 | 0.25 | 0.60 |
| 2.02 | 2.0% | 0.43 | 0.48 | 0.25 | 0.60 |
| 2.02 | 2.0% | 0.43 | 0.48 | 0.25 | 0.60 |
| 2.02 | 2.0% | 0.43 | 0.48 | 0.25 | 0.60 |
| 2.02 | 2.0% | 0.43 | 0.48 | 0.25 | 0.60 |
| 5.07 | 3.5% | 0.12 | 0.38 | 0.30 | 0.60 |
| 5.52 | 2.0% | 0.12 | 0.38 | 0.30 | 0.60 |
| 5.91 | 1.0% | 0.12 | 0.38 | 0.30 | 0.60 |
| 6.77 | 0.2% | 0.12 | 0.38 | 0.30 | 0.60 |
| 3.96 | 6.0% | 0.17 | 0.40 | 0.30 | 0.60 |
| 4.18 | 4.0% | 0.17 | 0.40 | 0.30 | 0.60 |
| 4.46 | 2.0% | 0.17 | 0.40 | 0.30 | 0.60 |
| 5.32 | 0.3% | 0.17 | 0.40 | 0.30 | 0.60 |
| 2.83 | 12.0% | 0.26 | 0.44 | 0.30 | 0.60 |
| 2.96 | 8.5% | 0.26 | 0.44 | 0.30 | 0.60 |

FIG. 5A

| R1/R3 | EBA | TP | TS | RqR_Prim.-Fan | RqR_Sec.-Fan |
|---|---|---|---|---|---|
| 3.12 | 5.0% | 0.26 | 0.44 | 0.30 | 0.60 |
| 3.38 | 2.0% | 0.26 | 0.44 | 0.30 | 0.60 |
| 3.58 | 1.0% | 0.26 | 0.44 | 0.30 | 0.60 |
| 3.80 | 0.5% | 0.26 | 0.44 | 0.30 | 0.60 |
| 2.67 | 12.0% | 0.29 | 0.46 | 0.30 | 0.60 |
| 2.78 | 8.5% | 0.29 | 0.46 | 0.30 | 0.60 |
| 2.92 | 5.0% | 0.29 | 0.46 | 0.30 | 0.60 |
| 3.43 | 0.8% | 0.29 | 0.46 | 0.30 | 0.60 |
| 1.58 | 12.0% | 0.32 | 0.34 | 0.30 | 0.60 |
| 1.63 | 8.5% | 0.32 | 0.34 | 0.30 | 0.60 |
| 1.70 | 5.0% | 0.32 | 0.34 | 0.30 | 0.60 |
| 1.84 | 2.0% | 0.32 | 0.34 | 0.30 | 0.60 |
| 5.16 | 3.5% | 0.12 | 0.38 | 0.35 | 0.60 |
| 5.63 | 2.0% | 0.12 | 0.38 | 0.35 | 0.60 |
| 6.02 | 1.0% | 0.12 | 0.38 | 0.35 | 0.60 |
| 6.89 | 0.2% | 0.12 | 0.38 | 0.35 | 0.60 |
| 4.03 | 6.0% | 0.17 | 0.40 | 0.35 | 0.60 |
| 4.26 | 4.0% | 0.17 | 0.40 | 0.35 | 0.60 |
| 4.55 | 2.0% | 0.17 | 0.40 | 0.35 | 0.60 |
| 5.42 | 0.3% | 0.17 | 0.40 | 0.35 | 0.60 |
| 2.88 | 12.0% | 0.26 | 0.44 | 0.35 | 0.60 |
| 3.02 | 8.5% | 0.26 | 0.44 | 0.35 | 0.60 |
| 3.18 | 5.0% | 0.26 | 0.44 | 0.35 | 0.60 |
| 3.44 | 2.0% | 0.26 | 0.44 | 0.35 | 0.60 |
| 3.64 | 1.0% | 0.26 | 0.44 | 0.35 | 0.60 |
| 3.87 | 0.5% | 0.26 | 0.44 | 0.35 | 0.60 |
| 2.72 | 12.0% | 0.29 | 0.46 | 0.35 | 0.60 |
| 2.83 | 8.5% | 0.29 | 0.46 | 0.35 | 0.60 |
| 2.97 | 5.0% | 0.29 | 0.46 | 0.35 | 0.60 |
| 3.49 | 0.8% | 0.29 | 0.46 | 0.35 | 0.60 |
| 1.61 | 12.0% | 0.32 | 0.34 | 0.35 | 0.60 |
| 1.66 | 8.5% | 0.32 | 0.34 | 0.35 | 0.60 |
| 1.73 | 5.0% | 0.32 | 0.34 | 0.35 | 0.60 |
| 1.87 | 2.0% | 0.32 | 0.34 | 0.35 | 0.60 |
| 5.16 | 3.5% | 0.12 | 0.38 | 0.35 | 0.60 |
| 5.63 | 2.0% | 0.12 | 0.38 | 0.35 | 0.60 |
| 6.02 | 1.0% | 0.12 | 0.38 | 0.35 | 0.60 |
| 6.89 | 0.2% | 0.12 | 0.38 | 0.35 | 0.60 |
| 4.03 | 6.0% | 0.17 | 0.40 | 0.35 | 0.60 |
| 4.26 | 4.0% | 0.17 | 0.40 | 0.35 | 0.60 |
| 4.55 | 2.0% | 0.17 | 0.40 | 0.35 | 0.60 |
| 5.42 | 0.3% | 0.17 | 0.40 | 0.35 | 0.60 |
| 2.88 | 12.0% | 0.26 | 0.44 | 0.35 | 0.60 |
| 3.02 | 8.5% | 0.26 | 0.44 | 0.35 | 0.60 |

FIG. 5B

| R1/R3 | EBA | TP | TS | RqR_Prim.-Fan | RqR_Sec.-Fan |
|---|---|---|---|---|---|
| 3.18 | 5.0% | 0.26 | 0.44 | 0.35 | 0.60 |
| 3.44 | 2.0% | 0.26 | 0.44 | 0.35 | 0.60 |
| 3.64 | 1.0% | 0.26 | 0.44 | 0.35 | 0.60 |
| 3.87 | 0.5% | 0.26 | 0.44 | 0.35 | 0.60 |
| 2.72 | 12.0% | 0.29 | 0.46 | 0.35 | 0.60 |
| 2.83 | 8.5% | 0.29 | 0.46 | 0.35 | 0.60 |
| 2.97 | 5.0% | 0.29 | 0.46 | 0.35 | 0.60 |
| 3.49 | 0.8% | 0.29 | 0.46 | 0.35 | 0.60 |
| 1.61 | 12.0% | 0.32 | 0.34 | 0.35 | 0.60 |
| 1.66 | 8.5% | 0.32 | 0.34 | 0.35 | 0.60 |
| 1.73 | 5.0% | 0.32 | 0.34 | 0.35 | 0.60 |
| 1.87 | 2.0% | 0.32 | 0.34 | 0.35 | 0.60 |
| 5.53 | 3.5% | 0.12 | 0.38 | 0.25 | 0.55 |
| 6.18 | 2.0% | 0.12 | 0.38 | 0.25 | 0.55 |
| 6.74 | 1.0% | 0.12 | 0.38 | 0.25 | 0.55 |
| 7.87 | 0.2% | 0.12 | 0.38 | 0.25 | 0.55 |
| 4.36 | 6.0% | 0.17 | 0.40 | 0.25 | 0.55 |
| 4.68 | 4.0% | 0.17 | 0.40 | 0.25 | 0.55 |
| 5.10 | 2.0% | 0.17 | 0.40 | 0.25 | 0.55 |
| 6.21 | 0.3% | 0.17 | 0.40 | 0.25 | 0.55 |
| 3.13 | 12.0% | 0.26 | 0.44 | 0.25 | 0.55 |
| 3.32 | 8.5% | 0.26 | 0.44 | 0.25 | 0.55 |
| 3.55 | 5.0% | 0.26 | 0.44 | 0.25 | 0.55 |
| 3.90 | 2.0% | 0.26 | 0.44 | 0.25 | 0.55 |
| 4.16 | 1.0% | 0.26 | 0.44 | 0.25 | 0.55 |
| 4.43 | 0.5% | 0.26 | 0.44 | 0.25 | 0.55 |
| 2.97 | 12.0% | 0.29 | 0.46 | 0.25 | 0.55 |
| 3.13 | 8.5% | 0.29 | 0.46 | 0.25 | 0.55 |
| 3.33 | 5.0% | 0.29 | 0.46 | 0.25 | 0.55 |
| 3.99 | 0.8% | 0.29 | 0.46 | 0.25 | 0.55 |
| 1.81 | 12.0% | 0.32 | 0.34 | 0.25 | 0.55 |
| 1.88 | 8.5% | 0.32 | 0.34 | 0.25 | 0.55 |
| 1.97 | 5.0% | 0.32 | 0.34 | 0.25 | 0.55 |
| 2.14 | 2.0% | 0.32 | 0.34 | 0.25 | 0.55 |
| 5.61 | 3.5% | 0.12 | 0.38 | 0.30 | 0.55 |
| 6.27 | 2.0% | 0.12 | 0.38 | 0.30 | 0.55 |
| 6.84 | 1.0% | 0.12 | 0.38 | 0.30 | 0.55 |
| 7.99 | 0.2% | 0.12 | 0.38 | 0.30 | 0.55 |
| 4.43 | 6.0% | 0.17 | 0.40 | 0.30 | 0.55 |
| 4.75 | 4.0% | 0.17 | 0.40 | 0.30 | 0.55 |
| 5.18 | 2.0% | 0.17 | 0.40 | 0.30 | 0.55 |
| 6.30 | 0.3% | 0.17 | 0.40 | 0.30 | 0.55 |
| 3.17 | 12.0% | 0.26 | 0.44 | 0.30 | 0.55 |
| 3.37 | 8.5% | 0.26 | 0.44 | 0.30 | 0.55 |

FIG. 5C

| R1/R3 | EBA | TP | TS | RqR_Prim.-Fan | RqR_Sec.-Fan |
|---|---|---|---|---|---|
| 3.61 | 5.0% | 0.26 | 0.44 | 0.30 | 0.55 |
| 3.96 | 2.0% | 0.26 | 0.44 | 0.30 | 0.55 |
| 4.22 | 1.0% | 0.26 | 0.44 | 0.30 | 0.55 |
| 4.50 | 0.5% | 0.26 | 0.44 | 0.30 | 0.55 |
| 3.01 | 12.0% | 0.29 | 0.46 | 0.30 | 0.55 |
| 3.18 | 8.5% | 0.29 | 0.46 | 0.30 | 0.55 |
| 3.38 | 5.0% | 0.29 | 0.46 | 0.30 | 0.55 |
| 4.05 | 0.8% | 0.29 | 0.46 | 0.30 | 0.55 |
| 1.84 | 12.0% | 0.32 | 0.34 | 0.30 | 0.55 |
| 1.90 | 8.5% | 0.32 | 0.34 | 0.30 | 0.55 |
| 2.00 | 5.0% | 0.32 | 0.34 | 0.30 | 0.55 |
| 2.18 | 2.0% | 0.32 | 0.34 | 0.30 | 0.55 |
| 5.71 | 3.5% | 0.12 | 0.38 | 0.35 | 0.55 |
| 6.39 | 2.0% | 0.12 | 0.38 | 0.35 | 0.55 |
| 6.97 | 1.0% | 0.12 | 0.38 | 0.35 | 0.55 |
| 8.14 | 0.2% | 0.12 | 0.38 | 0.35 | 0.55 |
| 4.51 | 6.0% | 0.17 | 0.40 | 0.35 | 0.55 |
| 4.84 | 4.0% | 0.17 | 0.40 | 0.35 | 0.55 |
| 5.27 | 2.0% | 0.17 | 0.40 | 0.35 | 0.55 |
| 6.42 | 0.3% | 0.17 | 0.40 | 0.35 | 0.55 |
| 3.23 | 12.0% | 0.26 | 0.44 | 0.35 | 0.55 |
| 3.43 | 8.5% | 0.26 | 0.44 | 0.35 | 0.55 |
| 3.67 | 5.0% | 0.26 | 0.44 | 0.35 | 0.55 |
| 4.03 | 2.0% | 0.26 | 0.44 | 0.35 | 0.55 |
| 4.30 | 1.0% | 0.26 | 0.44 | 0.35 | 0.55 |
| 4.58 | 0.5% | 0.26 | 0.44 | 0.35 | 0.55 |
| 3.07 | 12.0% | 0.29 | 0.46 | 0.35 | 0.55 |
| 3.23 | 8.5% | 0.29 | 0.46 | 0.35 | 0.55 |
| 3.45 | 5.0% | 0.29 | 0.46 | 0.35 | 0.55 |
| 4.13 | 0.8% | 0.29 | 0.46 | 0.35 | 0.55 |
| 1.87 | 12.0% | 0.32 | 0.34 | 0.35 | 0.55 |
| 1.94 | 8.5% | 0.32 | 0.34 | 0.35 | 0.55 |
| 2.04 | 5.0% | 0.32 | 0.34 | 0.35 | 0.55 |
| 2.22 | 2.0% | 0.32 | 0.34 | 0.35 | 0.55 |
| 5.71 | 3.5% | 0.12 | 0.38 | 0.35 | 0.55 |
| 6.39 | 2.0% | 0.12 | 0.38 | 0.35 | 0.55 |
| 6.97 | 1.0% | 0.12 | 0.38 | 0.35 | 0.55 |
| 8.14 | 0.2% | 0.12 | 0.38 | 0.35 | 0.55 |
| 4.51 | 6.0% | 0.17 | 0.40 | 0.35 | 0.55 |
| 4.84 | 4.0% | 0.17 | 0.40 | 0.35 | 0.55 |
| 5.27 | 2.0% | 0.17 | 0.40 | 0.35 | 0.55 |
| 6.42 | 0.3% | 0.17 | 0.40 | 0.35 | 0.55 |
| 3.23 | 12.0% | 0.26 | 0.44 | 0.35 | 0.55 |
| 3.43 | 8.5% | 0.26 | 0.44 | 0.35 | 0.55 |

FIG. 5D

| R1/R3 | EBA | TP | TS | RqR_Prim.-Fan | RqR_Sec.-Fan |
|---|---|---|---|---|---|
| 3.67 | 5.0% | 0.26 | 0.44 | 0.35 | 0.55 |
| 4.03 | 2.0% | 0.26 | 0.44 | 0.35 | 0.55 |
| 4.30 | 1.0% | 0.26 | 0.44 | 0.35 | 0.55 |
| 4.58 | 0.5% | 0.26 | 0.44 | 0.35 | 0.55 |
| 3.07 | 12.0% | 0.29 | 0.46 | 0.35 | 0.55 |
| 3.23 | 8.5% | 0.29 | 0.46 | 0.35 | 0.55 |
| 3.45 | 5.0% | 0.29 | 0.46 | 0.35 | 0.55 |
| 4.13 | 0.8% | 0.29 | 0.46 | 0.35 | 0.55 |
| 1.87 | 12.0% | 0.32 | 0.34 | 0.35 | 0.55 |
| 1.94 | 8.5% | 0.32 | 0.34 | 0.35 | 0.55 |
| 2.04 | 5.0% | 0.32 | 0.34 | 0.35 | 0.55 |
| 2.22 | 2.0% | 0.32 | 0.34 | 0.35 | 0.55 |
| 4.33 | 3.5% | 0.12 | 0.38 | 0.25 | 0.65 |
| 4.51 | 2.0% | 0.12 | 0.38 | 0.25 | 0.65 |
| 4.61 | 1.0% | 0.12 | 0.38 | 0.25 | 0.65 |
| 5.03 | 0.2% | 0.12 | 0.38 | 0.25 | 0.65 |
| 3.33 | 6.0% | 0.17 | 0.40 | 0.25 | 0.65 |
| 3.40 | 4.0% | 0.17 | 0.40 | 0.25 | 0.65 |
| 3.48 | 2.0% | 0.17 | 0.40 | 0.25 | 0.65 |
| 3.94 | 0.3% | 0.17 | 0.40 | 0.25 | 0.65 |
| 2.37 | 12.0% | 0.26 | 0.44 | 0.25 | 0.65 |
| 2.42 | 8.5% | 0.26 | 0.44 | 0.25 | 0.65 |
| 2.46 | 5.0% | 0.26 | 0.44 | 0.25 | 0.65 |
| 2.56 | 2.0% | 0.26 | 0.44 | 0.25 | 0.65 |
| 2.67 | 1.0% | 0.26 | 0.44 | 0.25 | 0.65 |
| 2.81 | 0.5% | 0.26 | 0.44 | 0.25 | 0.65 |
| 2.21 | 12.0% | 0.29 | 0.46 | 0.25 | 0.65 |
| 2.24 | 8.5% | 0.29 | 0.46 | 0.25 | 0.65 |
| 2.28 | 5.0% | 0.29 | 0.46 | 0.25 | 0.65 |
| 2.54 | 0.8% | 0.29 | 0.46 | 0.25 | 0.65 |
| 1.36 | 2.0% | 0.32 | 0.34 | 0.25 | 0.65 |
| 4.40 | 3.5% | 0.12 | 0.38 | 0.30 | 0.65 |
| 4.58 | 2.0% | 0.12 | 0.38 | 0.30 | 0.65 |
| 4.68 | 1.0% | 0.12 | 0.38 | 0.30 | 0.65 |
| 5.11 | 0.2% | 0.12 | 0.38 | 0.30 | 0.65 |
| 3.38 | 6.0% | 0.17 | 0.40 | 0.30 | 0.65 |
| 3.45 | 4.0% | 0.17 | 0.40 | 0.30 | 0.65 |
| 3.53 | 2.0% | 0.17 | 0.40 | 0.30 | 0.65 |
| 4.00 | 0.3% | 0.17 | 0.40 | 0.30 | 0.65 |
| 2.41 | 12.0% | 0.26 | 0.44 | 0.30 | 0.65 |
| 2.45 | 8.5% | 0.26 | 0.44 | 0.30 | 0.65 |
| 2.49 | 5.0% | 0.26 | 0.44 | 0.30 | 0.65 |
| 2.59 | 2.0% | 0.26 | 0.44 | 0.30 | 0.65 |
| 2.71 | 1.0% | 0.26 | 0.44 | 0.30 | 0.65 |

FIG. 5E

| R1/R3 | EBA | TP | TS | RqR_Prim.-Fan | RqR_Sec.-Fan |
|---|---|---|---|---|---|
| 2.85 | 0.5% | 0.26 | 0.44 | 0.30 | 0.55 |
| 2.24 | 12.0% | 0.29 | 0.46 | 0.30 | 0.55 |
| 2.27 | 8.5% | 0.29 | 0.46 | 0.30 | 0.55 |
| 2.31 | 5.0% | 0.29 | 0.46 | 0.30 | 0.65 |
| 2.58 | 0.8% | 0.29 | 0.46 | 0.30 | 0.65 |
| 1.38 | 2.0% | 0.32 | 0.34 | 0.30 | 0.65 |
| 4.48 | 3.5% | 0.12 | 0.38 | 0.35 | 0.65 |
| 4.66 | 2.0% | 0.12 | 0.38 | 0.35 | 0.65 |
| 4.77 | 1.0% | 0.12 | 0.38 | 0.35 | 0.65 |
| 5.20 | 0.2% | 0.12 | 0.38 | 0.35 | 0.65 |
| 3.44 | 6.0% | 0.17 | 0.40 | 0.35 | 0.65 |
| 3.51 | 4.0% | 0.17 | 0.40 | 0.35 | 0.65 |
| 3.59 | 2.0% | 0.17 | 0.40 | 0.35 | 0.65 |
| 4.07 | 0.3% | 0.17 | 0.40 | 0.35 | 0.65 |
| 2.45 | 12.0% | 0.26 | 0.44 | 0.35 | 0.65 |
| 2.50 | 8.5% | 0.26 | 0.44 | 0.35 | 0.65 |
| 2.54 | 5.0% | 0.26 | 0.44 | 0.35 | 0.65 |
| 2.64 | 2.0% | 0.26 | 0.44 | 0.35 | 0.65 |
| 2.76 | 1.0% | 0.26 | 0.44 | 0.35 | 0.65 |
| 2.90 | 0.5% | 0.26 | 0.44 | 0.35 | 0.65 |
| 2.28 | 12.0% | 0.29 | 0.46 | 0.35 | 0.65 |
| 2.31 | 8.5% | 0.29 | 0.46 | 0.35 | 0.65 |
| 2.35 | 5.0% | 0.29 | 0.46 | 0.35 | 0.65 |
| 2.63 | 0.8% | 0.29 | 0.46 | 0.35 | 0.65 |
| 1.41 | 2.0% | 0.32 | 0.34 | 0.35 | 0.65 |
| 4.48 | 3.5% | 0.12 | 0.38 | 0.35 | 0.65 |
| 4.66 | 2.0% | 0.12 | 0.38 | 0.35 | 0.65 |
| 4.77 | 1.0% | 0.12 | 0.38 | 0.35 | 0.65 |
| 5.20 | 0.2% | 0.12 | 0.38 | 0.35 | 0.65 |
| 3.44 | 6.0% | 0.17 | 0.40 | 0.35 | 0.65 |
| 3.51 | 4.0% | 0.17 | 0.40 | 0.35 | 0.65 |
| 3.59 | 2.0% | 0.17 | 0.40 | 0.35 | 0.65 |
| 4.07 | 0.3% | 0.17 | 0.40 | 0.35 | 0.65 |
| 2.45 | 12.0% | 0.26 | 0.44 | 0.35 | 0.65 |
| 2.50 | 8.5% | 0.26 | 0.44 | 0.35 | 0.65 |
| 2.54 | 5.0% | 0.26 | 0.44 | 0.35 | 0.65 |
| 2.64 | 2.0% | 0.26 | 0.44 | 0.35 | 0.65 |
| 2.76 | 1.0% | 0.26 | 0.44 | 0.35 | 0.65 |
| 2.90 | 0.5% | 0.26 | 0.44 | 0.35 | 0.65 |
| 2.28 | 12.0% | 0.29 | 0.46 | 0.35 | 0.65 |
| 2.31 | 8.5% | 0.29 | 0.46 | 0.35 | 0.65 |
| 2.35 | 5.0% | 0.29 | 0.46 | 0.35 | 0.65 |
| 2.63 | 0.8% | 0.29 | 0.46 | 0.35 | 0.65 |
| 1.41 | 2.0% | 0.32 | 0.34 | 0.35 | 0.65 |

*FIG. 5F*

GAS TURBINE ENGINE WITH THIRD STREAM

CROSS-REFERENCE TO RELATED APPLICATION

This application is a non-provisional, continuation-in-part application claiming the benefit of priority under to U.S. Non-Provisional application Ser. No. 17/717,462, filed Apr. 11, 2022, which is hereby incorporated by reference in its entirety.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 5A through 5F is a table of example embodiments of the present disclosure.

DETAILED DESCRIPTION

Figure 1:
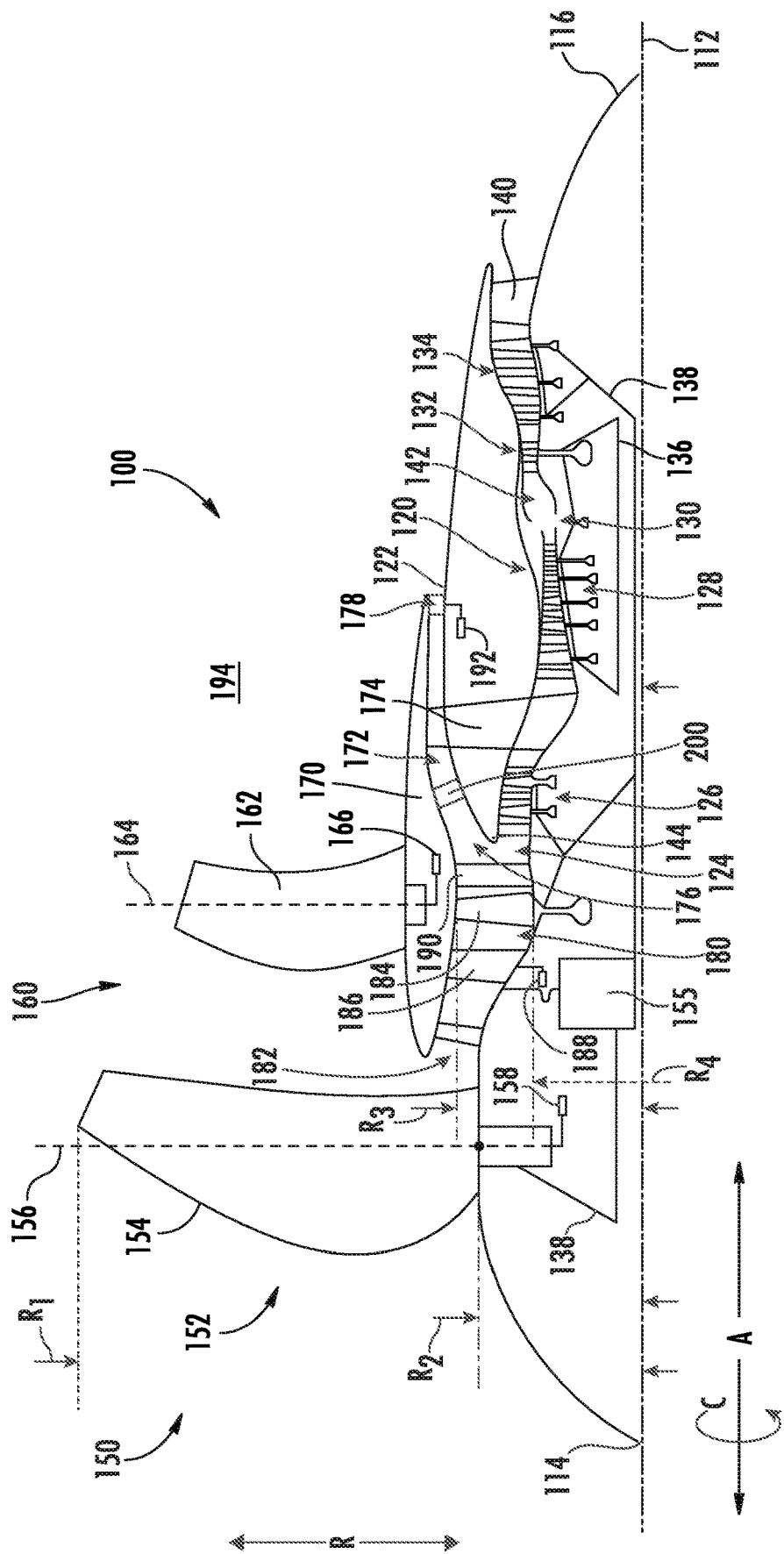
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term "bypass ratio" refers to a ratio in an engine of an amount of airflow that is bypassed around the engine's ducted inlet to the amount that passes through the engine's ducted inlet. For example, in the embodiment of FIG. 1, discussed below, the bypass ratio refers to an amount of airflow from the fan 152 that flows over the fan cowl 170 to an amount of airflow from the fan 152 that flows through the engine inlet 182.

The term "corrected tip speed," with respect to a fan having fan blades, refers to a speed of the fan blades at an outer tip of the fan blades along a radial direction, corrected to correspond to standard day conditions (i.e., the speed the fan blades at their outer tips would rotate at if the upstream temperature corresponded to standard day conditions). A corrected tip speed of a rotor (such as the fan) may be calculated by dividing a physical speed by the square root of an average rotor inlet temperature (in Rankine) over a reference temperature of 518.67 Rankine.

Generally, a turbofan engine includes a relatively large fan to provide a desired amount of thrust without overloading the fan blades (i.e., without increasing a disk loading of the fan blades of the fan beyond a certain threshold), and therefore to maintain a desired overall propulsive efficiency for the turbofan engine.

Conventional turbofan engine design practice has been to provide a large fan, or rather a high diameter fan, on the engine to provide as much of a total thrust for the turbofan engine as reasonably possible. The objective, when designing the conventional turbofan engine was to maximize a propulsive efficiency of the turbofan engine. A turbofan engine including such a large fan, however, may result in, e.g., problems packaging the turbofan engine on an aircraft, a relatively heavy turbofan engine (particularly for ducted turbofan engines), etc. Further, as the need for turbofan engines to provide more thrust continues, the thermal demands on the turbofan engines correspondingly increases.

The inventors of the present disclosure, however, found that for a three stream turbofan engine having a primary fan and a secondary fan, with the secondary fan being a ducted fan providing an airflow to a third stream of the engine, the amount of thrust generation required from the primary fan may be reduced, with the secondary fan providing the difference through the third stream. Such a configuration may maintain a desired overall propulsive efficiently for the turbofan engine, or unexpectedly may in fact increase the over propulsive efficiency of the turbofan engine.

The inventors proceeded in the manner of designing an engine with given primary fan characteristics, secondary fan characteristics, and turbomachine characteristics; checking the propulsive efficiency of the designed turbofan engine; redesigning the turbofan engine with varying primary fan, secondary fan, and turbomachine characteristics; rechecking the propulsive efficiency of the redesigned turbofan engine; etc. during the design of several different types of turbofan engines, including the gas turbine engine described below with reference to FIGS. 1, 2, 7, 8 and 9. During the course of this practice of studying/evaluating various primary fan characteristics, secondary fan characteristics, and turbomachine characteristics considered feasible for best satisfying mission requirements, it was discovered that a certain relationship exists between a percentage of a total turbofan engine thrust provided by a third stream (as defined herein) and the relative sizes of a turbofan's primary to secondary fan, or more particularly a radius ratio of the primary fan to secondary fan.

Moreover, it was discovered that in lieu of calculating the percentage of total turbofan engine thrust provided by the third stream for each design, which may be difficult to accurately calculate across various operating conditions, ambient conditions, engine designs, etc., an area-weighted specific thrust rating for the primary fan and for the secondary fan (area weighted based on an inlet area to the third stream and an inlet area to a bypass passage) may effectively and accurately represent the percentage of total turbofan engine thrust provided by the third stream.

The resulting radius ratio to third-stream thrust relationship, as herein referred to, can be thought of as an indicator of the ability of a turbofan engine to maintain or even improve upon a desired propulsive efficiency via the third stream and, additionally, indicating an improvement in the turbofan engine's packaging concerns and weight concerns, and thermal management capabilities.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 128 drives the high pressure compressor 128 through a high pressure shaft 136. In this regard, the high pressure turbine 128 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base. Further, the fan 152, or rather each fan blade 154 of the fan 152, defines a fan radius ratio, RqR, equal to $R_2$ divided by $R_1$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to the fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base. Further, the ducted fan 184, or rather each fan blade of the ducted fan 184, defines a fan radius ratio, RqR, equal to $R_4$ divided by $R_3$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The engine 100 also defines or includes an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

During operation of the engine 100 at an operating condition, the engine 100 generates a total thrust, $Fn_{Total}$. The operating condition may be operation of the engine 100 at a rated speed during standard day operating condition. The total thrust is a sum of a first stream thrust, $Fn_{1S}$ (e.g., a primary fan thrust generated by an airflow over the fan cowl 170 and core cowl 122, generated by the fan 152, through a bypass passage 194), the third stream thrust, $Fn_{3S}$, and a second stream thrust, $Fn_{2S}$ (e.g., a thrust generated by an airflow through the core duct 142 exiting through the turbomachine exhaust nozzle 140).

It will be appreciated that, as noted briefly above, it may be difficult to accurately calculate a percentage of the total thrust, $Fn_{Total}$, provided by the third stream, or rather the airflow through the fan duct 172 exiting through the fan exhaust nozzle 178, across various operating conditions, ambient conditions, engine designs, etc. The inventors have found, however, that area-weighting a specific thrust rating for the primary fan (a primary fan specific thrust rating $T_P$)

and a specific thrust rating for the secondary fan (a secondary fan specific thrust rating $T_S$) provides an accurate representation of an expected percentage of the total thrust, $Fn_{Total}$, provided by the third stream.

Figure 2:
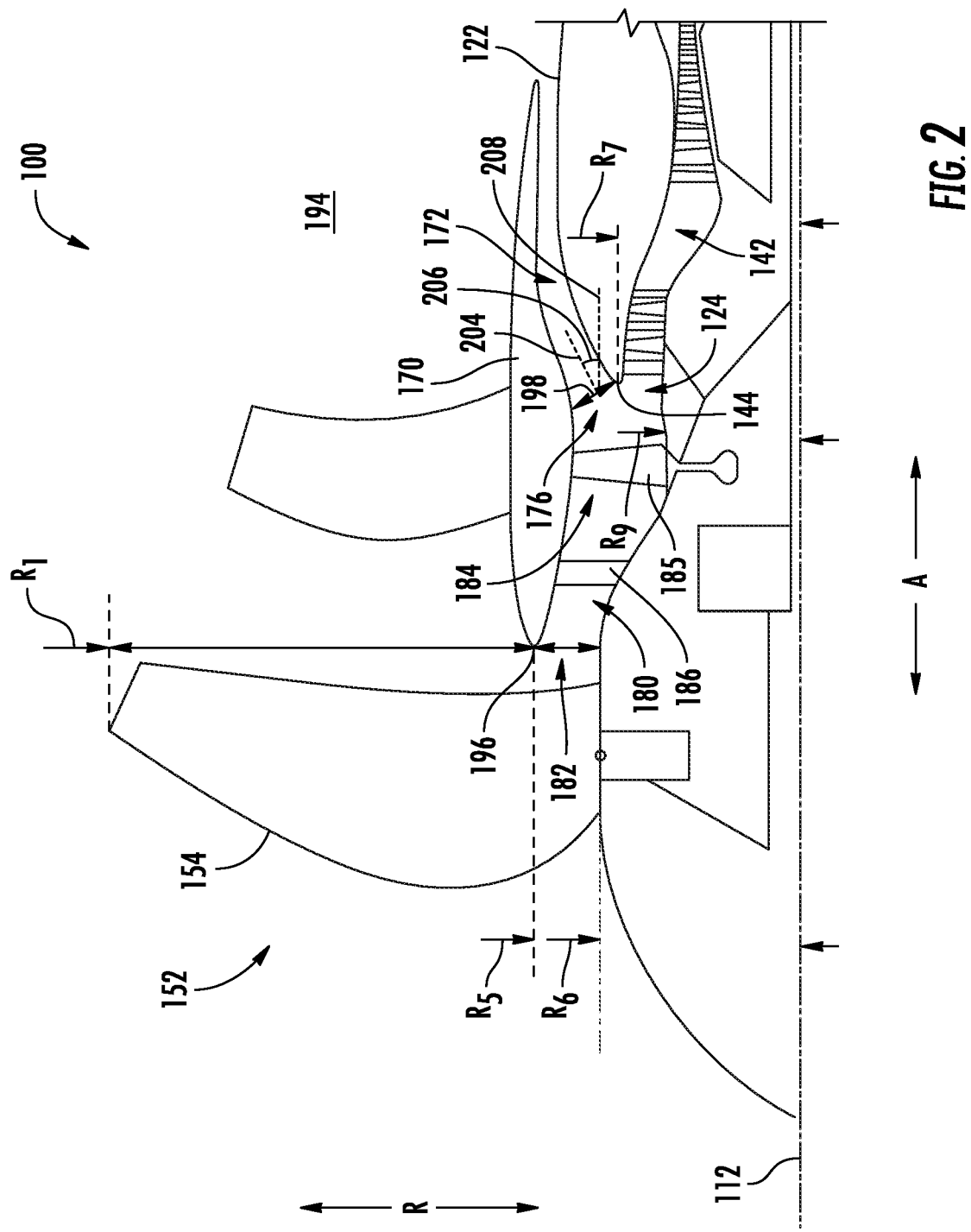
FIG. 2 is a close-up, schematic view of the exemplary three-stream engine of FIG. 1.

More specifically, referring to FIG. 2, a close-up, simplified, schematic view of the turbofan engine 100 of FIG. 1 is provided. The turbofan engine 100, as noted above includes a primary fan, or rather fan 152 having fan blades 154, and a secondary fan, or rather ducted fan 184 having fan blades 185. Airflow from the fan 152 is split between the bypass passage 194 and the inlet duct 180 by an inlet splitter 196. Airflow from the ducted fan 184 is split between the fan duct 172 and the core duct 142 by the leading edge 144 (sometimes also referred to as the fan duct splitter).

The exemplary turbofan engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the turbofan engine 100 further defines a fan cowl splitter radius, $R_5$. The fan cowl splitter radius, $R_5$, is defined along the radial direction R from the longitudinal axis 112 to the inlet splitter 196. The primary fan outer fan area refers to an area defined by the formula: $\pi R_1^2 - \pi R_5^2$.

The primary fan inner fan area, $A_{P\_In}$, refers to an area defined by an annulus representing a portion of the fan 152 located inward of the inlet splitter 196 of the fan cowl 170. In particular, the turbofan engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area refers to an area defined by the formula: $\pi R_5^2 - \pi R_6^2$.

The secondary fan outer fan area, $A_{S\_Out}$, refers to an area representing a portion an airflow from the ducted fan 184 that is provided to the fan duct 172. In particular, the leading edge 144 defines a leading edge radius, $R_7$, and the turbofan engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
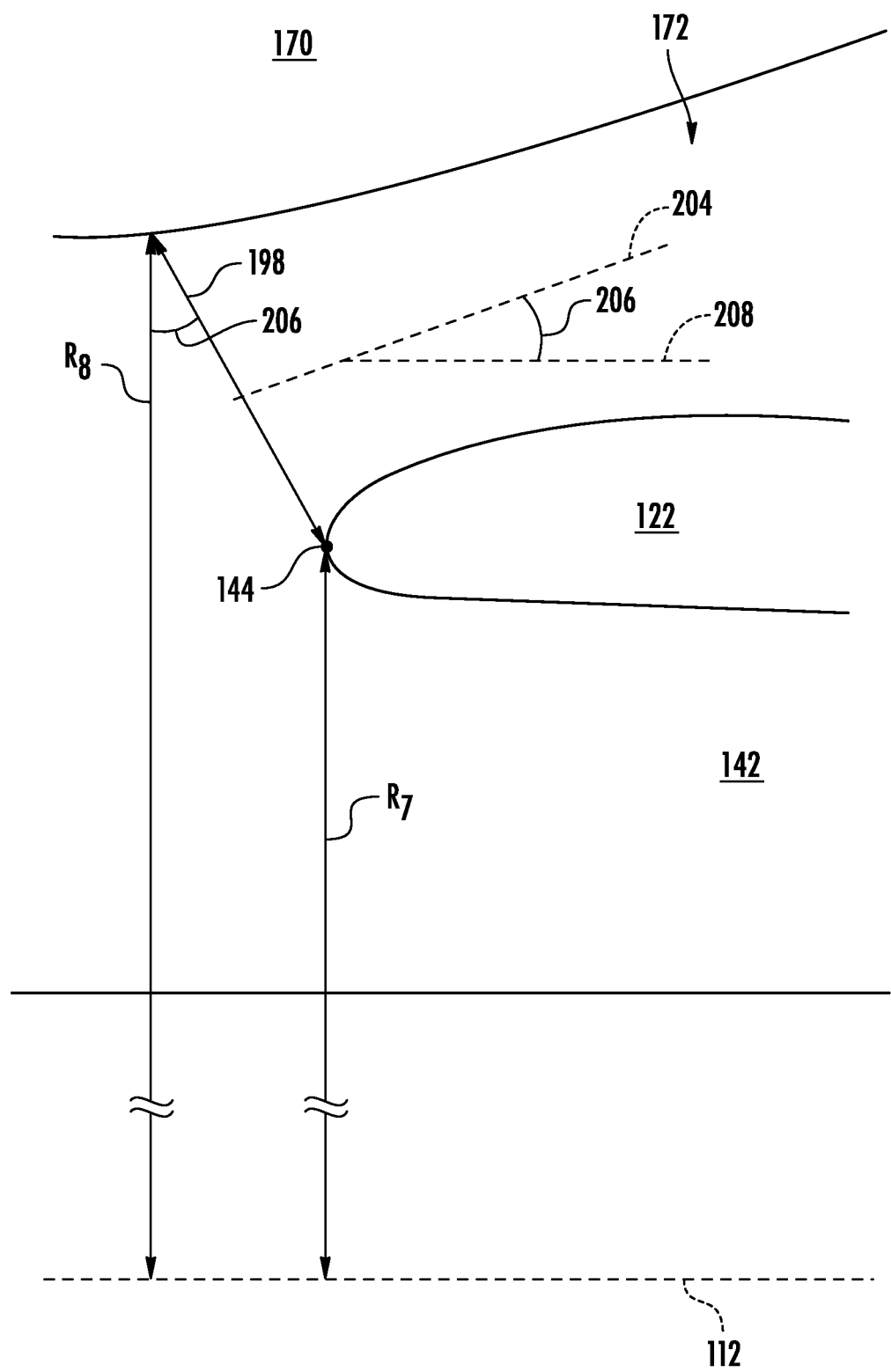
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. Notably, an angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees. The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi(R_8^2 - R_7^2)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the turbofan engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The primary fan inner fan area refers to an area defined by the formula: $\pi R_7^2 - \pi R_9^2$.

These areas, and in particular the primary fan outer fan area, $A_{P\_Out}$, and secondary fan outer fan area, $A_{S\_Out}$, may be used to weight the primary fan specific thrust rating $T_P$ and secondary fan specific thrust rating $T_S$ to accurately represent the expected percentage of the total thrust, $Fn_{Total}$, provided by the third stream, as will be explained in more detail below. Notably, as used herein, a ratio of the primary fan outer fan area, $A_{P\_Out}$, to the secondary fan outer fan area, $A_{S\_Out}$, is referred to herein as an Effective Bypass Area, or EBA.

As alluded earlier, the inventors discovered, unexpectedly during the course of gas turbine engine design—i.e., designing gas turbine engines (e.g., both ducted and unducted turbofan engines and turboprop engines) having a variety of different primary fan and secondary fan characteristics, both physical and operational—and evaluating an overall propulsive efficiency, a significant relationship exists between a percentage of a total gas turbine engine thrust provided by a third stream (as defined herein) and the relative sizes of a gas turbine engine's primary to secondary fan. The resulting radius ratio to third-stream thrust relationship, as herein referred to, can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, higher and lower third stream thrusts change the packaging abilities of the gas turbine engine and the thermal sink capabilities of the gas turbine engine. For example, increased thrust from an airflow through the third stream generally means more airflow (on a mass flowrate basis) through the third stream, which in turn mean more thermal capacity for such airflow. Further, the inventors found that if you provide too little thrust from the third stream, the gas turbine engine may be unnecessarily large (and thus more difficult to package) and heavy, and further may not provide a desired amount of thermal sink capabilities. If you provide too much thrust through the third stream, the engine may not fully take advantage of relatively efficient thrust that may be generated by the primary fan.

The above relationship may be a function of a bypass ratio of the gas turbine engine, which may generally be limited by reasonable engine temperatures, including operating temperatures, such as exhaust gas temperatures (EGT). For example, as will be appreciated in view of the foregoing teaching, a radius of the primary fan relative to a radius of the secondary fan, along with a percentage of a total gas turbine engine thrust generated by an airflow through the third stream during operation, are each, in part, a function of the bypass ratio and together characterize the balancing in the relationship noted above.

Many aspects of an architecture dictate the bypass ratio of a gas turbine engine. For example, the bypass ratio is, in part, a function of a corrected tip speed of the primary fan relative to a corrected tip speed the secondary fan, as well as a specific thrust of the respective primary and secondary fans. The specific thrusts of the primary and secondary fans, in turn, are a function of a pressure ratio of the primary and secondary fans, respectively, and a disk loading (also referred to as a power loading) on the primary and secondary fans, respectively. These factors also affect the balancing in the relationship noted above, as will described in more detail below with reference to an effective fan parameter, EFP.

As noted above, the inventors of the present disclosure discovered a relationship between the percentage of engine thrust configured to be provided by the airflow through the third stream and the radius ratio of the primary fan and secondary fan that can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, is expressed as:

$$\frac{R_1}{R_3} = \sqrt{(EFP)\frac{\left(1 - RqR^2_{(Sec.-Fan)}\right)}{\left(1 - RqR^2_{Prim.-Fan}\right)}\left(\frac{T_P}{T_S}\right)(EBA)} \quad (1)$$

where $R_1$ is a tip radius of the primary fan, $R_2$ is a hub radius of the primary fan, $R_3$ is a tip radius of the secondary fan, $R_4$ is a hub radius of the secondary fan, $RqR_{Prim.-Fan}$ is the ratio of $R_2$ to $R_1$, $RqR_{Sec.-Fan}$ is the ratio of $R_4$ to $R_3$, EFP is an effective fan parameter, $T_P$ is a primary fan specific thrust rating, $T_S$ is a secondary fan specific thrust rating, and EBA is the effective bypass area.

EBA relates a primary fan outer fan area, $A_{P\_Out}$, to a secondary fan outer fan area, $A_{S\_Out}$, and is expressed as a percentage. In particular, EBA is represented by the following ratio: $A_{P\_Out}/A_{S\_Out}$. A higher EBA corresponds to a larger primary fan bypass ratio and a low secondary fan bypass ratio. Conversely, a lower EBA corresponds to a smaller primary fan bypass ratio and a higher secondary fan bypass ratio.

EFP is a function of a corrected tip speed of the primary fan, a corrected tip speed of the secondary fan, a disk loading of the primary fan, and a disk loading of the secondary fan. EFP, by taking into account the corrected tip speeds of the primary and secondary fans, accounts for such factors as the specific engine configuration (e.g., geared, direct drive, etc.), which may have some influence on the relationship between tip radius ratio ($R_1$ to $R_3$) and the percent thrust through the third stream (% $Fn_{3S}$) for a turbofan engine having a desired propulsive efficiency. The relationship of these contributing factors to EFP to the tip radius ratio ($R_1$ to $R_3$) and the percent thrust through the third stream (% $Fn_{3S}$) for a turbofan engine is described in more detail above.

The primary fan specific thrust rating $T_P$ and the secondary fan specific thrust rating $T_S$ reflect the corrected tip speeds for the primary fan (fan 152 in the embodiment of FIGS. 1 and 2) and for the secondary fan (ducted fan 184 in the embodiment of FIGS. 1 and 2) at a rated speed during standard day operating conditions. Example values for the primary fan specific thrust rating $T_P$ and the secondary fan specific thrust rating $T_S$ as may be incorporated into Expression (1) are provided below and in FIG. 4.

Figure 4:
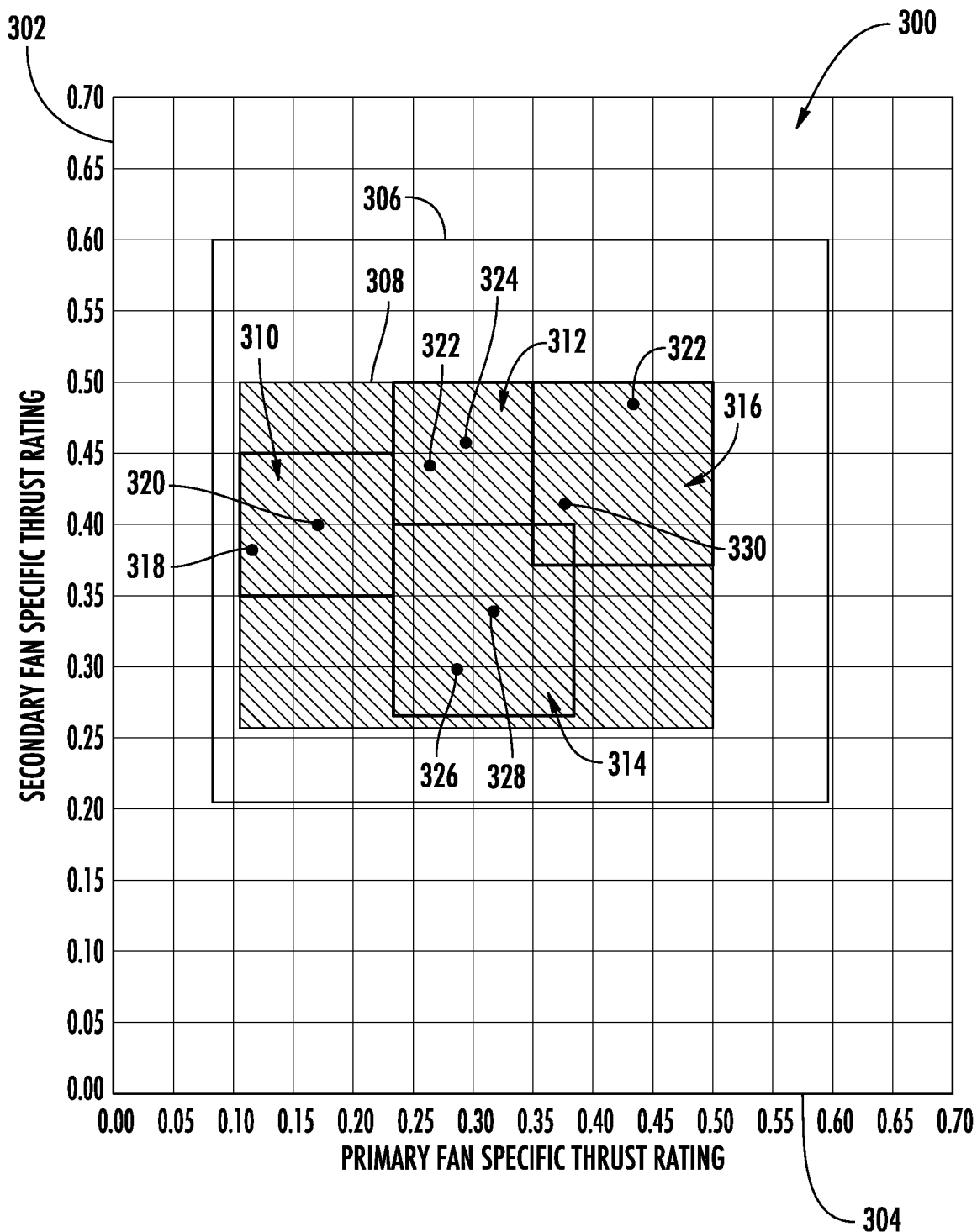
FIG. 4 is a graph depicting exemplary primary fan specific thrust rating $T_P$ values and exemplary secondary fan specific thrust rating $T_S$ values in accordance with exemplary aspects of the present disclosure.

In particular, FIG. 4 provides a graph 300 showing exemplary primary fan specific thrust ratings $T_P$ along a Y-axis 302 and exemplary secondary fan specific thrust ratings $T_S$ along an X-axis 304. Notably, the graph 300 has plotted example primary fan specific thrust ratings $T_P$ and secondary fan specific thrust ratings $T_S$ from at least certain of the example engines described below with reference to FIGS. 5A through 5F. As will be appreciated from the examples plotted in FIG. 4, the secondary fan specific thrust rating $T_S$ may be considered as generally higher than the primary fan specific thrust rating $T_P$ for a given engine, as the secondary fan is downstream of, and builds off of a flow from, the primary fan.

For the embodiments of FIG. 4, the primary fan specific thrust rating $T_P$ ranges from 0.08 to 0.59, and in at least certain exemplary aspects from 0.1 to 0.5. Similarly, the secondary fan specific thrust rating $T_S$ ranges from 0.21 to 0.6, and in at least certain exemplary aspects from 0.26 to 0.5. These broader ranges correspond to an area 306 in FIG. 4, and the narrower ranges correspond to an area 308 in FIG. 4

In particular, the graph 300 in FIG. 4 identifies four subregions of the primary fan specific thrust rating $T_P$ and the secondary fan specific thrust rating $T_S$ values. In particular, the graph 300 of FIG. 4 identifies a first subregion 310, a second subregion 312, a third subregion 314, and a fourth subregion 316.

The first subregion 310 includes two example engines plotted—example 318 and example 320. Example 318 corresponds to a turboprop engine (see, e.g., exemplary turboprop engine 526 described below with reference to FIG. 7) and example 320 corresponds to an open rotor engine, such as the exemplary engine 100 of FIGS. 1 and 2. Each of these engines is a geared engine (i.e., includes a gearbox between a driving shaft and a fan shaft; see, e.g., gearbox 155 of FIG. 1) and further is an unducted engine (i.e., does not include an outer nacelle surrounding the primary fan). The primary fan specific thrust rating $T_P$ for the first subregion 310 ranges from 0.1 to 0.23 and the secondary fan specific thrust rating $T_S$ for the first subregion 310 ranges from 0.35 to 0.45.

It will be appreciated that the primary fan specific thrust ratings $T_P$ of the first subregion 310 are relatively low as compared to the rest of the examples plotted in FIG. 4 for at least the reason that the engines are unducted engines, allowing for a larger fan diameter. With a larger diameter fan, a lower primary fan specific thrust ratings $T_P$ is acceptable while still providing a desired amount of thrust for the engine (as the engine may rotate more slowly, with less thrust per unit area). In such a manner, it will be appreciated that the primary fans of the examples 318, 320 may be relatively efficient as they will generally define a relatively small pressure ratio during operation.

Further, as noted, the engines plotted as examples 318, 320 are geared engines and may define a relatively high gear ratio (e.g., as compared to at least certain examples in the second subregion 312, discussed below). Nonetheless, the secondary fan specific thrust ratings $T_S$ may still be smaller (e.g., as compared to at least certain examples in the second subregion 312). In particular, since the secondary fan specific thrust rating $T_S$ of the secondary fan builds off of the primary fan specific thrust ratings $T_P$ of the primary fan (and the primary fan specific thrust ratings $T_P$ are smaller as compared to the examples in the second subregion 312), the secondary fan specific thrust ratings $T_S$ are also smaller.

The second subregion 312 includes two example engines plotted—example 322 and example 324. Examples 322, 324 each correspond to a geared and ducted turbofan engine (see, e.g., exemplary geared, ducted, turbofan engine 544 described below with reference to FIG. 9, having a gearbox 546). More specifically, each of these engines is a geared engine and further is a ducted engine (i.e., includes an outer nacelle surrounding the primary fan). The primary fan specific thrust rating $T_P$ for the second subregion 312 ranges from 0.23 to 0.35 and the secondary fan specific thrust rating $T_S$ for the second subregion 312 ranges from 0.4 to 0.5.

It will be appreciated that the primary fan specific thrust ratings $T_P$ of the engines in second subregion 312 are higher than the engines in the first subregion 310. Such may generally be a result of the engines being ducted engines, as the fans may be smaller, requiring them to rotate more quickly to generate a desired amount of thrust. In addition, the engines plotted as examples 322, 324 may have lower gear ratios than the engines plotted as examples 318, 320. While such would generally result in a reduced secondary fan specific thrust rating $T_S$, as the engines plotted as examples 322, 324 have higher primary fan specific thrust rating $T_P$, such may drive the secondary fan specific thrust rating $T_S$ higher.

Referring still to FIG. 4, the third and fourth subregions 314, 316 include example engines plotted that are all direct drive engines (i.e., do not include a reduction gearbox between a driving shaft and a fan shaft). Generally for each of these engines, the secondary fan specific thrust rating $T_S$ will be lower for a given primary fan specific thrust rating $T_P$, as the secondary fan is rotating at the same speed as the primary fan.

In particular, referring first to the third subregion 314, the third subregion 314 includes examples 326 and 328. The engines plotted as examples 326 and 328 are direct drive, ducted turbofan engines (see, e.g., exemplary direct drive turbofan engine 538 described below with reference to FIG. 8). In particular, these engines may define a relatively high bypass ratio for subsonic flight operations. The primary fan specific thrust rating $T_P$ for the third subregion 314 ranges from 0.23 to 0.38 and the secondary fan specific thrust rating $T_S$ for the third subregion 314 ranges from 0.26 to 0.4.

By contrast, referring now to the fourth subregion 316, the fourth subregion 316 includes examples 330 and 332. The engines plotted as examples 330 and 332 are also direct drive, ducted turbofan engines, but instead may define relatively low bypass ratios, e.g., for high flight speed operations favoring smaller fan diameters. In such a manner, as compared to the engines plotted as examples 326, 328, the engines plotted as examples 330, 332 may have smaller fans that rotate more quickly, favoring higher speed and lower drag over efficiency. The primary fan specific thrust rating $T_P$ for the fourth subregion 316 ranges from 0.35 to 0.5 and the secondary fan specific thrust rating $T_S$ for the fourth subregion 316 ranges from 0.37 to 0.5.

Further, values for various other parameters of the influencing characteristics of an engine defined by Expression (1) are set forth below in TABLE 3:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| EFP | Effective fan parameter | 0.15 to 33, such as 2 to 20, such as 2 to 4.5, such as 2.5 to 10, such as 4 to 8, such as 3 to 5 |
| $V_C$ Prim.-Fan | Corrected primary fan tip speed | 500 feet per second (fps) to 2,000 fps, such as 600 fps to 1,800 fps |
| $V_C$ Sec.-Fan | Corrected secondary fan tip speed | 500 feet per second (fps) to 2,000 fps, such as 750 fps to 1,900 fps, such as 1,200 fps to 1,800 fps |
| $T_P$ | Primary fan specific thrust rating | 0.08 to 0.59, such as 0.1 to 0.5 |
| $T_S$ | Secondary fan specific thrust rating | 0.21 to 0.6, such as 0.26 to 0.5 |
| EBA | Effective Bypass Area | 0.2% to 15%, such as 2% to 10% |

Figure 6A:
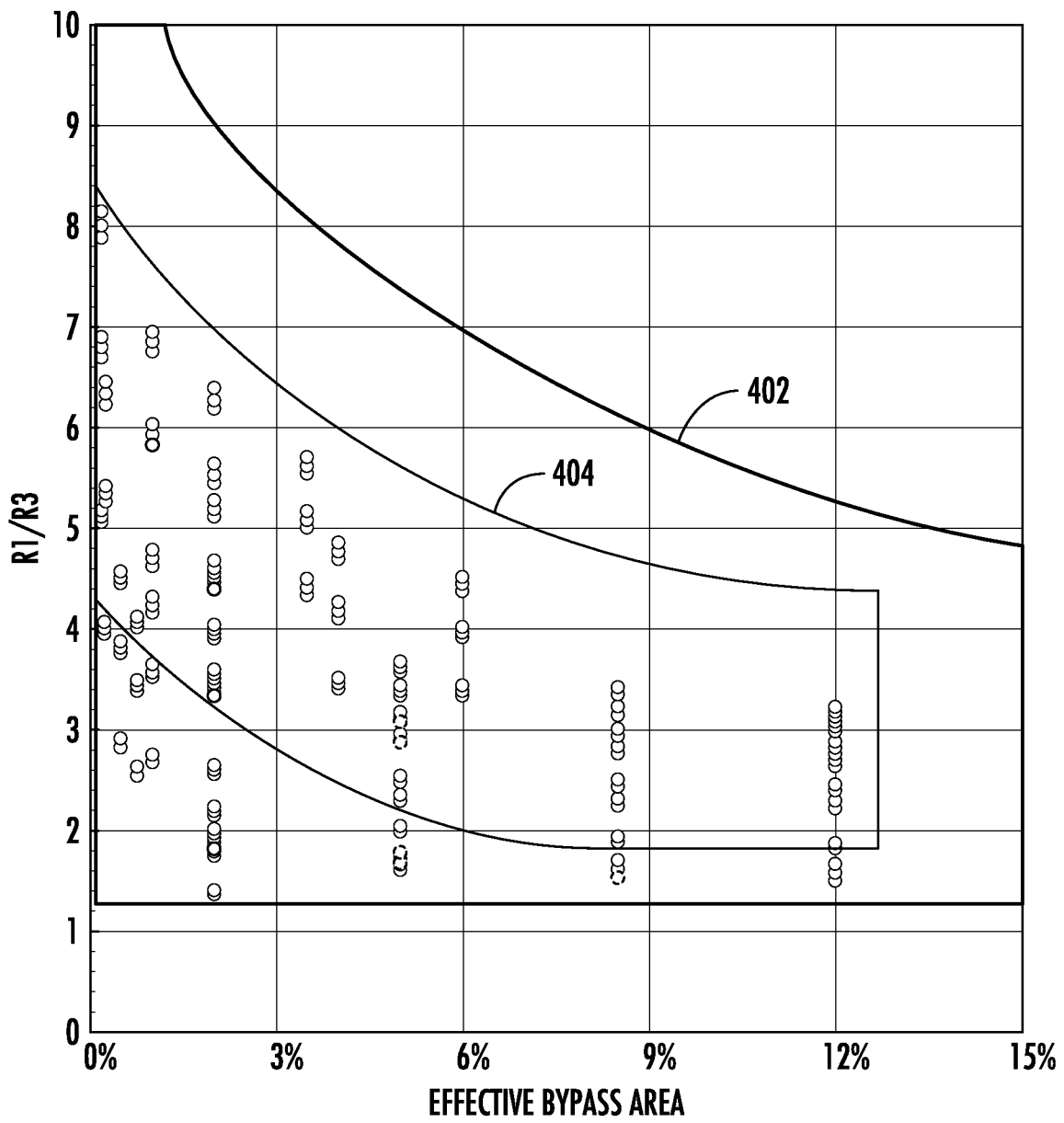
FIGS. 6A through 6C are graphs depicting a range of radius ratios to Effective Bypass Areas in accordance with various example embodiments of the present disclosure.
Figure 6B:
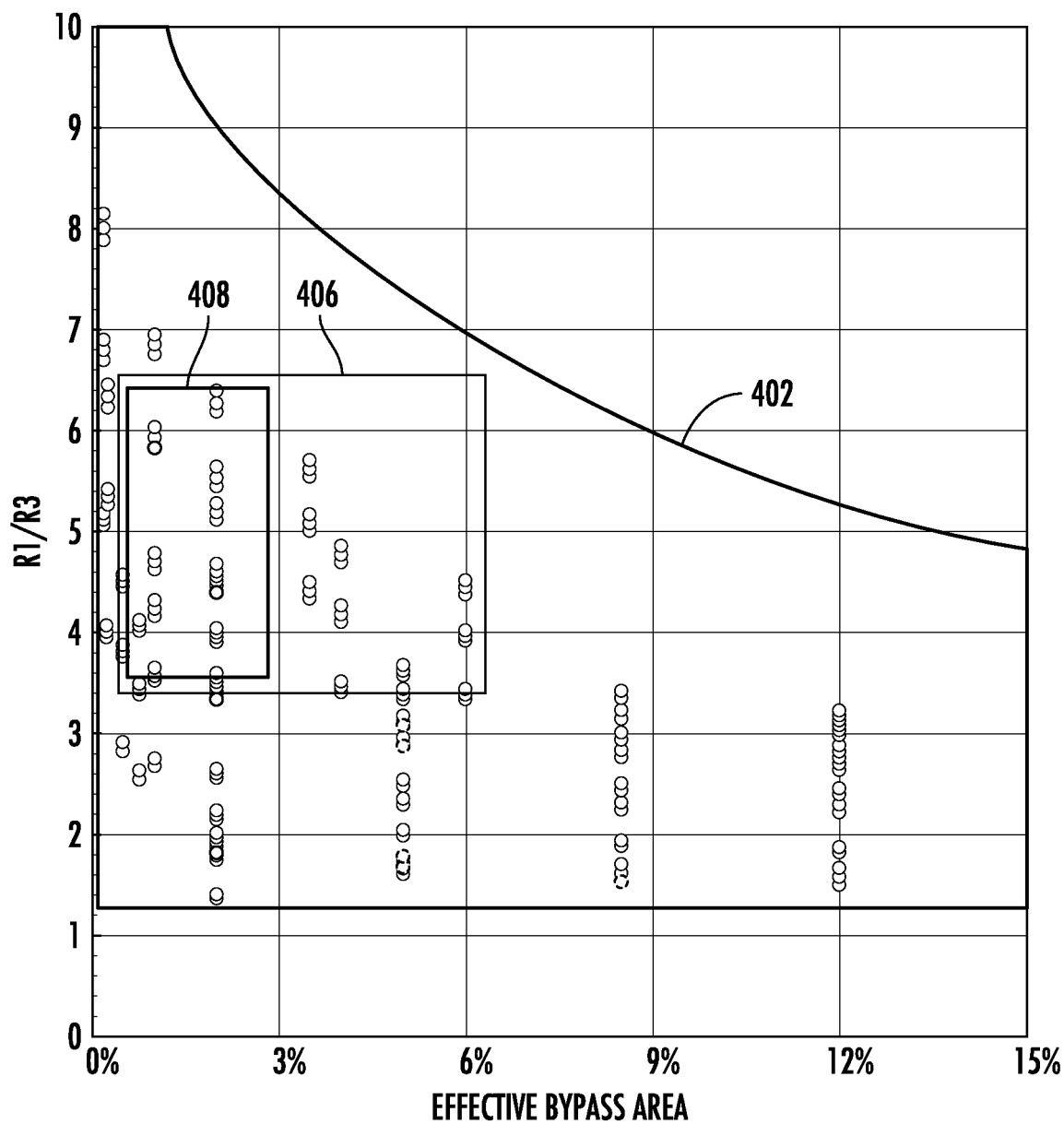
Figure 6C:
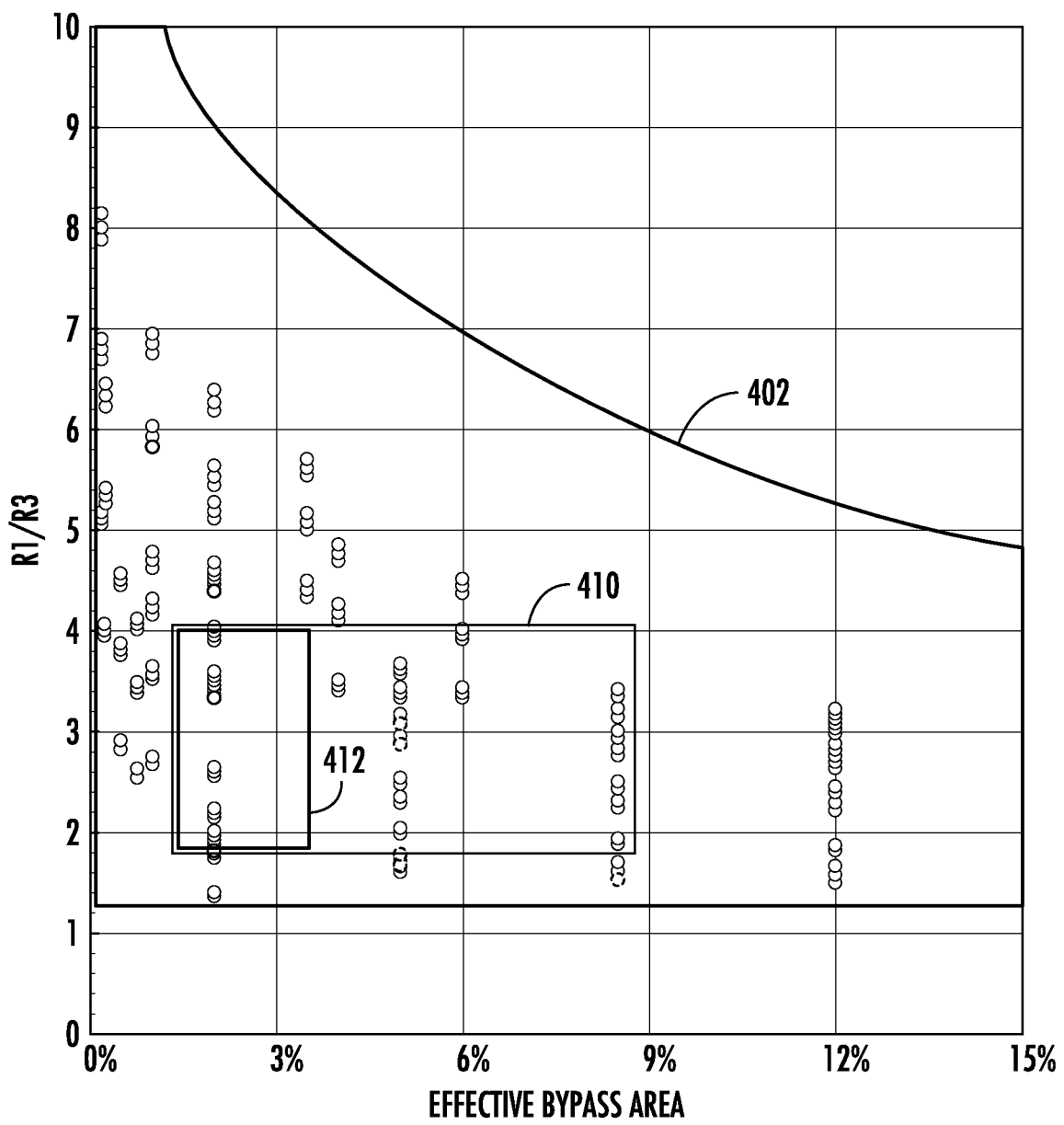

Referring now to FIGS. 5A through 5F and 6A through 6C, exemplary gas turbine engines are illustrated in accordance with one or more exemplary embodiments of the present disclosure, showing the relationships between the various parameters of Expression (1). In particular, FIGS. 5A through 5F provides a table including numerical values corresponding to several of the plotted gas turbine engines in FIGS. 5A through 5C. FIGS. 6A through 6C are plots of gas turbine engines in accordance with one or more exemplary embodiments of the present disclosure, showing the relationships between the tip radius ratio ($R_1$ to $R_3$; Y-Axis) and the EBA, effective bypass area (X-axis). FIG. 6A highlights a subrange based on an EFP value subrange. FIG. 6B highlights a subrange for unducted engines. FIG. 6C highlights a subrange for ducted engines. As will be appreciated at least from Expression (1) and the discussion herein, the EBA multiplied by the ratio of primary fan specific thrust rating TP to secondary fan specific thrust rating TS (see FIG. 4) may generally correlate to a percentage of thrust provided by a third stream of an engine. In such a manner, it will be appreciated that the subranges of FIG. 6B (e.g., 406, 408) may be combined with the subranges in subregions 310 and 312 in FIG. 4, and similarly the subranges of FIG. 6C (e.g., 410, 412) may be combined with the subranges in subregions 314 and 316 in FIG. 4. Further, the subrange of area 308 of FIG. 4, the subrange in FIG. 6A, or both may be combined with any of the other subranges herein (e.g., of FIG. 6B or 6C).

Referring particularly to FIG. 6A, a first range 402 and a second range 404 are provided. The first range 402 may correspond to an EFP greater than or equal to 0.15 and less than or equal to 33. This range, in combination with the broader ranges for primary and secondary specific thrust ratings $T_P$, $T_S$ and EBA listed in TABLE 1 may correlate to a percent thrust through the third stream % $Fn_{3S}$ between 2% and 50%. Such may result in an engine having a desired propulsive efficiency.

The second range 404 may correspond to an EFP greater than or equal to 2 and less than or equal to 20. This range, in combination with the broader ranges for the primary and secondary specific thrust ratings $T_P$, $T_S$ and EBA listed in TABLE 1 may correlate to a narrower range of percent thrust through the third stream % $Fn_{3,S}$, e.g., between 5% and about 20%. Such may result in an engine having a more preferred propulsive efficiency.

Referring now to FIG. 6B, a third range 406 is provided along with a fourth range 408, which is a subrange of the third range 406. The third and fourth ranges 406, 408 relate to unducted engines, such as a turboprop engine (see FIG. 7) or an open rotor engine (see FIGS. 1 and 2). The third range 406 may correspond to an EBA between 0.8% and 6.5% and an $R_1$ to $R_3$ value of 3.4 to 6.5. The fourth range 408 may correspond to an EBA between 0.9% and 2.9% and an $R_1$ to $R_3$ value of 3.5 to 6.4.

As discussed above, the unducted engines may generally have larger fans, and as a result may have a larger $R_1$ to $R_3$ value. Similarly, because of the larger fans, the EBA may generally be lower, as the bypass area of the primary fan is so large. Notably, the turboprop engines may generally have a higher $R_1$ to $R_3$ value than the open rotor turbofan engines. For example, the $R_1$ to $R_3$ value for turboprop engines may be between 4.5 and 6.5, and the $R_1$ to $R_3$ value for open rotor engines may be between 3.5 and 5.

Referring now to FIG. 6C, a fifth range 410 is provided along with a sixth range 412, which is a subrange of the fifth range 410. The fifth and sixth ranges 410, 412 relate to ducted engines, such as a geared, ducted turbofan engine (see FIG. 9) or a direct drive, ducted, turbofan engine (see FIG. 8). The fifth range 410 may correspond to an EBA between 1.25% and 8.9% and an $R_1$ to $R_3$ value of 1.7 to 4. The sixth range 412 may correspond to an EBA between 1.35% and 3.8% and an $R_1$ to $R_3$ value of 1.7 to 3.9.

As discussed above, the ducted engines may generally have smaller fans, and as a result may have a small $R_1$ to $R_3$ value. As a result of the smaller fans, the EBA may generally be higher, as the bypass area of the primary fan is not as large as compared to a potential bypass area of the secondary fan. Notably, the geared turbofan engines may generally have a higher $R_1$ to $R_3$ value than the direct drive turbofan engines, as the gearbox allows for the primary fan to rotate slower than the secondary fan, allowing for a larger fan without a significant increase in a pressure ratio of the primary fan (and thus without a significant reduction in efficiency). For example, the $R_1$ to $R_3$ value for geared turbofan engines may be between 2.3 and 4, and the $R_1$ to $R_3$ value for direct drive turbofan engines may be between 1.7 and 2.8.

It will be appreciated that although the discussion above is generally relating to the open rotor engine 10 described above with reference to FIGS. 1 and 2, in various embodiments of the present disclosure, the relationships outlined above with respect to, e.g., Expression (1) may be applied to any other suitable engine architecture. For example, reference will now be made to FIGS. 7 through 9, each depicting schematically an engine architecture associated with the present disclosure.

Figure 7:
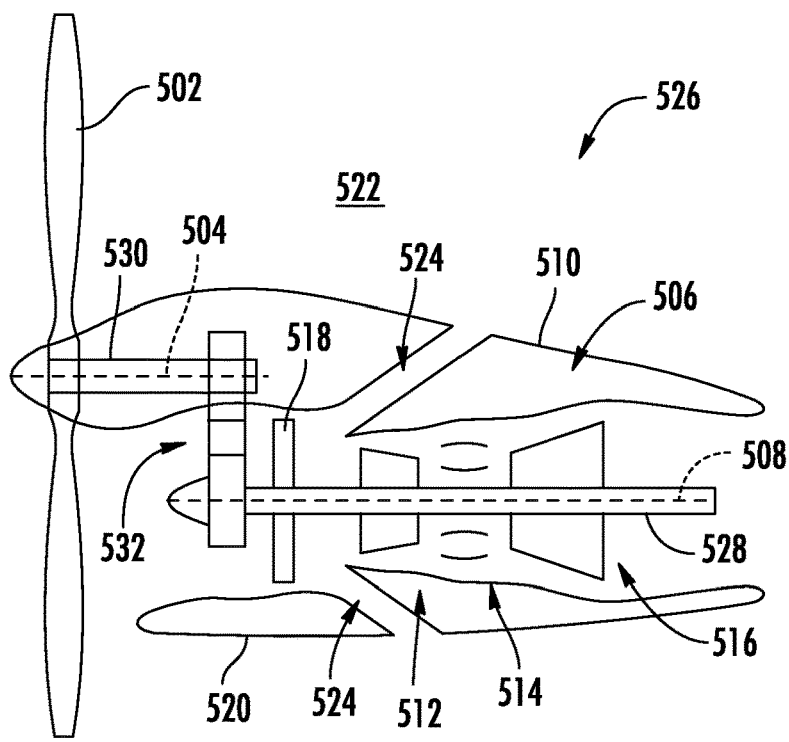
FIG. 7 is a schematic view of a turboprop engine in accordance with an exemplary aspect of the present disclosure.
Figure 8:
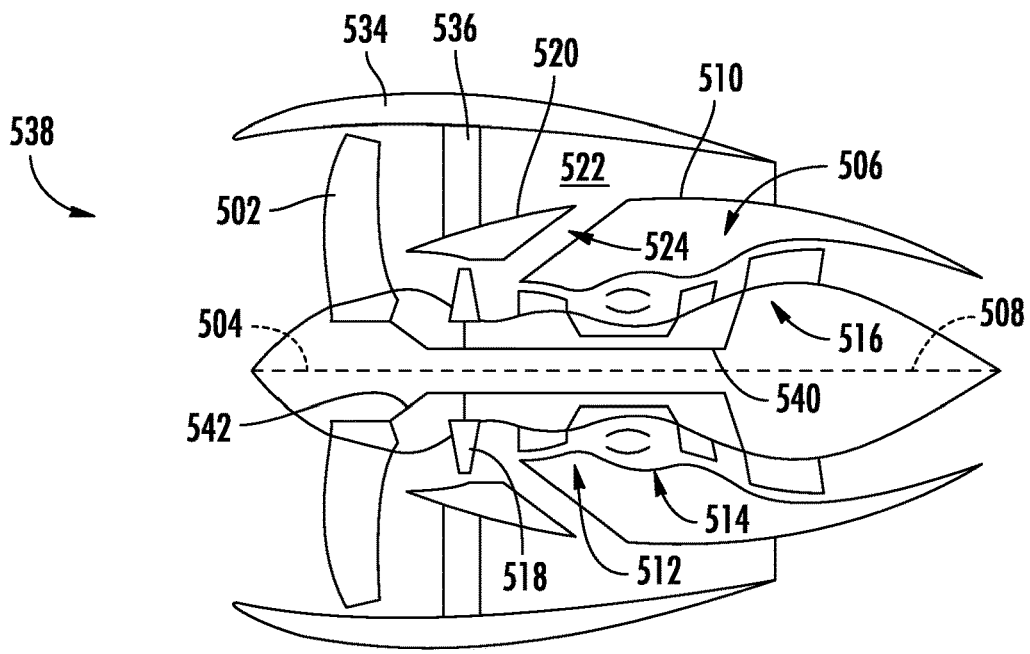
FIG. 8 is a schematic view of a direct drive, ducted, turbofan engine in accordance with an exemplary aspect of the present disclosure.
Figure 9:
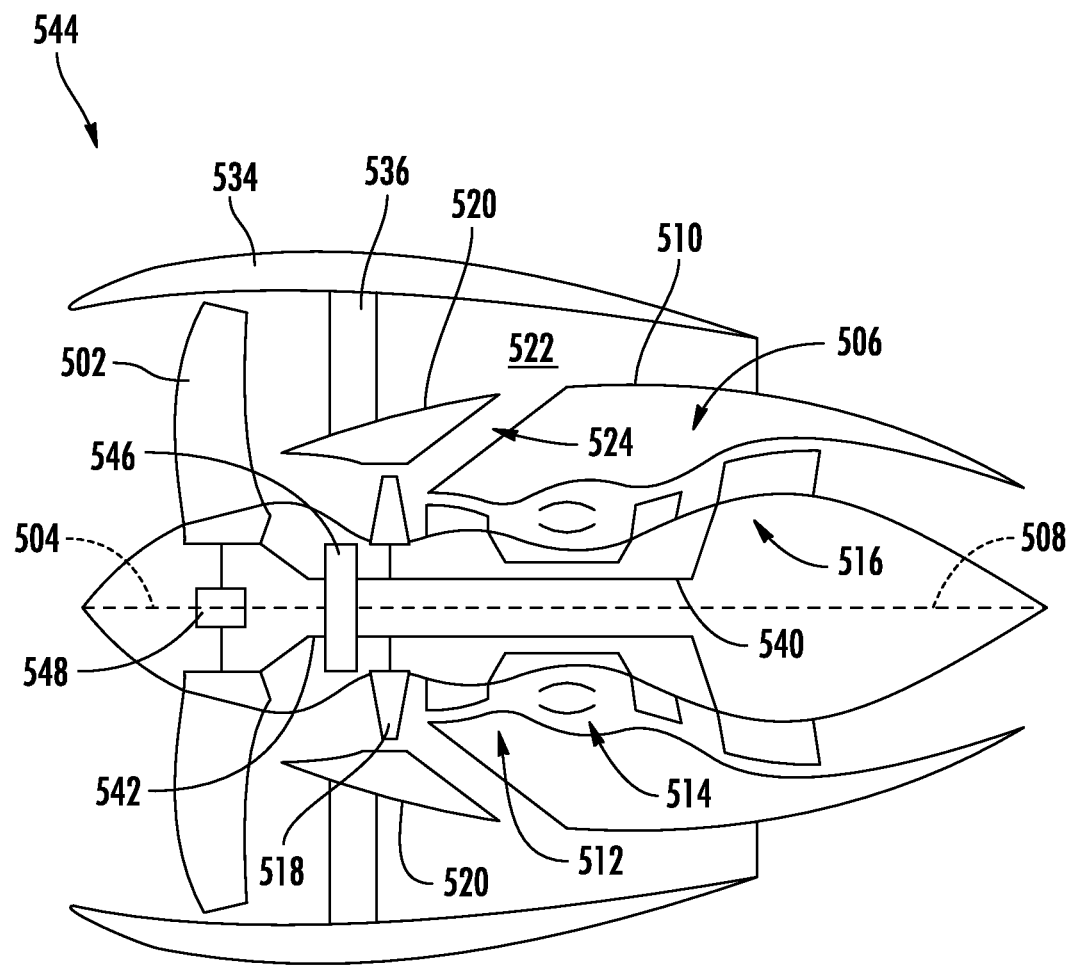
FIG. 9 is a schematic view of a geared, ducted, turbofan engine in accordance with an exemplary aspect of the present disclosure.

Each of the gas turbine engines of FIGS. 7 through 9 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 7 through 9 each also include a ducted mid-fan or secondary fan 518. The gas turbine engines each include a fan cowl 520 surrounding the secondary fan 518.

Referring still to the gas turbine engines of FIGS. 7 through 9, the gas turbine engines each also define a bypass passage 522 downstream of the respective rotor 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

Referring particularly to FIG. 7, the exemplary gas turbine engine depicted is configured as a turboprop engine 526. In such a manner, the rotor 502 (or primary fan) is configured as a propeller, defining a relatively large diameter. Further, the turboprop engine 526 includes an engine shaft 528 driven by the turbomachine 506, a fan shaft 530 rotatable with the rotor 502, and a gearbox 532 mechanically coupling the engine shaft 528 with the fan shaft 530. The gearbox 532 is an offset gearbox such that the rotor axis 504 is radially offset from the longitudinal axis 508 of the turboprop engine 526.

Notably, in other embodiments of the present disclosure, a turboprop engine may be provided with a reverse flow combustor.

Referring to FIGS. 8 and 9, the gas turbine engines are each configured as turbofan engines, and more specifically as ducted turbofan engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 8 is configured as a direct drive, ducted, turbofan engine 538. In particular, the direct drive, ducted, turbofan engine 538 includes an engine shaft 540 driven by the turbine section 516 and a fan shaft 542 rotatable with the rotor 502. The fan shaft 542 is configured to rotate directly with (i.e., at the same speed as) the engine shaft 540.

By contrast, the gas turbine engine of FIG. 9 is configured as a geared, ducted, turbofan engine 544. In particular, the geared, ducted, turbofan engine 544 includes the engine shaft 540 driven by the turbine section 516 and the fan shaft 542 rotatable with the rotor 502. However, the exemplary geared, ducted, turbofan engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the secondary fan 518.

Notably, the exemplary geared, ducted, turbofan engine 544 of FIG. 9 further includes a pitch change mechanism 548 operable with the rotor 502 to change a pitch of the rotor blades of the rotor 502. Such may allow for an increased efficiency of the gas turbine engine.

As will be appreciated from the description herein, various embodiments of a gas turbine engine are provided. Certain of these embodiments may be an unducted, single rotor gas turbine engine (see FIGS. 1 and 2), a turboprop engine (see FIG. 7), or a ducted turbofan engine (see FIGS. 8 and 9). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet. Alternatively, in other embodiments, the fan diameter may be at least 4 feet, such as at least 8 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 3.2. For example, in particular embodiments, the gear ratio is within a range of 3.2 to 14.0, within a range of 4.1 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining a centerline and a circumferential direction, the gas turbine engine comprising: a turbomachine comprising a compressor section, a combustion section, and a turbine section arranged in serial flow order, the turbomachine comprising an inlet splitter defining in part an inlet to a working gas flowpath and a fan duct splitter defining in part an inlet to a fan duct flowpath; a primary fan driven by the turbomachine defining a primary fan tip radius R1, a primary fan hub radius R2, and a primary fan specific thrust rating TP; a secondary fan located downstream of the primary fan and driven by the turbomachine, at least a portion of an airflow from the primary fan configured to bypass the secondary fan, the secondary fan defining a secondary fan tip radius R3, a secondary fan hub radius R4, and a secondary fan specific thrust rating TS; wherein the gas turbine engine defines an Effective Bypass Area, and wherein a ratio of R1 to R3 equals $$\frac{R_1}{R_3} = \sqrt{(EFP)\frac{\left(1 - RqR^2_{(Sec.-Fan)}\right)}{\left(1 - RqR^2_{Prim.-Fan}\right)}\left(\frac{T_P}{T_S}\right)(EBA)};$$

wherein EFP is between 0.15 and 33, wherein RqRPrim.-Fan is a ratio of $R_2$ to $R_1$, wherein RqRSec.-Fan is a ratio of $R_4$ to $R_3$, wherein the primary fan specific thrust rating TP is between 0.08 and 0.59, wherein the secondary fan specific thrust rating TS is between 0.21 and 0.6, and wherein the Effective Bypass Area is between 0.2% and 15%.

The gas turbine engine of any of the preceding clause, wherein the ratio of R1 to R3 is between 1.35 and 10.

The gas turbine engine of any preceding clause, wherein EFP is between 2 and 20.

The gas turbine engine of any preceding clause, wherein the Effective Bypass Area is between 2% and 10%.

The gas turbine engine of any preceding clause, wherein RqRPrim.-Fan is between 0.2 and 0.4.

The gas turbine engine of any preceding clause, wherein RqRPrim.-Fan is between 0.25 and 0.35.

The gas turbine engine of any preceding clause, wherein RqRSec.-Fan is between 0.2 and 0.9.

The gas turbine engine of any preceding clause, wherein RqRSec.-Fan is between 0.35 and 0.7.

The gas turbine engine of any preceding clause, wherein the gas turbine engine is an unducted gas turbine engine, wherein the Effective Bypass Area is between 0.8% and 6.5%, wherein R1 to R3 is between 3.4 and 6.5, wherein the primary fan specific thrust rating TP is between 0.1 and 0.35, wherein the secondary fan specific thrust rating TS is between 0.35 and 0.5.

The gas turbine engine of any preceding clause, wherein the Effective Bypass Area is between 0.9% and 2.9%, and wherein R1 to R3 is between 3.5 and 6.4.

The gas turbine engine of any preceding clause, wherein the gas turbine engine is a ducted gas turbine engine, wherein the Effective Bypass Area is between 1.25% and 8.9%, wherein R1 to R3 is between 1.7 and 4, wherein the primary fan specific thrust rating TP is between 0.23 and 0.5, wherein the secondary fan specific thrust rating TS is between 0.28 and 0.5.

The gas turbine engine of any preceding clause, wherein the Effective Bypass Area is between 1.35% and 8.9%, and wherein R1 to R3 is between 1.7 and 3.9.

The gas turbine engine of any preceding clause, wherein EFP is between 2 and 4.5, wherein the primary fan defines a primary fan corrected tip speed during operation of the gas turbine engine at the rated speed during standard day operating conditions, wherein the secondary fan defines a secondary fan corrected tip speed during operation of the gas turbine engine at the rated speed during standard day operating conditions, wherein the primary fan corrected tip speed is between 600 feet per second and 1,800 feet per second, and wherein the secondary fan corrected tip speed is between 1,200 feet per second and 1,800 feet per second.

The gas turbine engine of any preceding clause, wherein the fan duct flowpath defines an outlet, and wherein the gas turbine engine further comprises: a variable geometry component associated with the secondary fan, wherein the variable geometry component is a stage of variable inlet guide vanes located immediately upstream of the secondary fan, a variable exhaust nozzle located at the outlet of the fan duct flowpath, or both.

The gas turbine engine of any preceding clause, wherein the gas turbine engine defines a bypass airflow passage, wherein the primary fan is configured to provide a first portion of a primary fan airflow to the bypass airflow passage and a second portion of the primary fan airflow to the secondary fan, and wherein the secondary fan is configured to provide a first portion of a secondary fan airflow to the fan duct flowpath as the fan duct airflow and a second portion of the secondary fan airflow to the working gas flowpath.

The gas turbine engine of any preceding clause, further comprising: a heat exchanger positioned in thermal communication with the fan duct flowpath.

The gas turbine engine of any preceding clause, further comprising: an array of inlet guide vanes located immediately upstream of the secondary fan.

The gas turbine engine of any preceding clause, further comprising: an array of outlet guide vanes located immediately downstream of the secondary fan and upstream of the fan duct.

The gas turbine engine of any preceding clause, further comprising: a variable geometry exhaust nozzle located at an exit of the fan duct.

The gas turbine engine of any preceding clause, further comprising: a fan cowl surrounding the secondary fan located downstream of the primary fan, the fan cowl defining in part an engine inlet located downstream of the primary fan; wherein the turbomachine further comprises a core cowl surrounding at least in part the compressor section, the combustion section, and the turbine section, and wherein the fan duct is defined between the core cowl and the fan cowl.

We claim:

1. A gas turbine engine defining a centerline and a circumferential direction, the gas turbine engine comprising:
   a turbomachine comprising a compressor section, a combustion section, and a turbine section arranged in serial flow order, the turbomachine comprising an inlet splitter defining in part an inlet to a working gas flowpath and a fan duct splitter defining in part an inlet to a fan duct flowpath;
   a primary fan driven by the turbomachine defining a primary fan tip radius $R_1$ between 2 feet and 14 feet, a primary fan hub radius $R_2$, and a primary fan specific thrust rating $T_P$; and
   a secondary fan located downstream of the primary fan and driven by the turbomachine, at least a portion of an airflow from the primary fan configured to bypass the secondary fan, the secondary fan defining a secondary fan tip radius $R_3$, a secondary fan hub radius $R_4$, and a secondary fan specific thrust rating $T_S$,
   wherein the gas turbine engine defines an Effective Bypass Area (EBA), and wherein a ratio of $R_1$ to $R_3$ equals $$\frac{R_1}{R_3} = \sqrt{(EFP)\frac{(1-RqR_{(Sec.-Fan)}^2)}{(1-RqR_{Prim.-Fan}^2)}\left(\frac{T_P}{T_S}\right)(EBA)},$$

and
   wherein EFP is between 0.15 and 33, wherein $RqR_{Prim.-Fan}$ is a ratio of $R_2$ to $R_1$, wherein $RqR_{Sec.-Fan}$ is a ratio of $R_4$ to $R_3$, wherein the primary fan specific thrust rating $T_P$ is between 0.08 and 0.59, wherein the secondary fan specific thrust rating $T_S$ is between 0.21 and 0.6, and wherein the Effective Bypass Area (EBA) is between 0.2% and 15%.

2. The gas turbine engine of claim 1, wherein the ratio of $R_1$ to $R_3$ is between 1.35 and 10.

3. The gas turbine engine of claim 1, wherein EFP is between 2 and 20.

4. The gas turbine engine of claim 1, wherein the Effective Bypass Area is between 2% and 10%.

5. The gas turbine engine of claim 1, wherein $RqR_{Prim.-Fan}$ is between 0.2 and 0.4.

6. The gas turbine engine of claim 5, wherein $RqR_{Prim.-Fan}$ is between 0.25 and 0.35.

7. The gas turbine engine of claim 1, wherein $RqR_{Sec.-Fan}$ is between 0.2 and 0.9.

8. The gas turbine engine of claim 7, wherein $RqR_{Sec.-Fan}$ is between 0.2 and 0.7.

9. The gas turbine engine of claim 1, wherein the gas turbine engine is an unducted gas turbine engine, wherein the Effective Bypass Area is between 0.8% and 6.5%, wherein $R_1$ to $R_3$ is between 3.4 and 6.5, wherein the primary fan specific thrust rating $T_P$ is between 0.1 and 0.35, wherein the secondary fan specific thrust rating $T_S$ is between 0.35 and 0.5.

10. The gas turbine engine of claim 9, wherein the Effective Bypass Area is between 0.9% and 2.9%, and wherein $R_1$ to $R_3$ is between 3.5 and 6.4.

11. The gas turbine engine of claim 1, wherein the gas turbine engine is a ducted gas turbine engine, wherein the Effective Bypass Area is between 1.25% and 8.9%, wherein $R_1$ to $R_3$ is between 1.7 and 4, wherein the primary fan specific thrust rating $T_P$ is between 0.23 and 0.5, wherein the secondary fan specific thrust rating $T_S$ is between 0.28 and 0.5.

12. The gas turbine engine of claim 11, wherein the Effective Bypass Area is between 1.35% and 8.9%, and wherein $R_1$ to $R_3$ is between 1.7 and 3.9.

13. The gas turbine engine of claim 1, wherein EFP is between 2 and 4.5, wherein the primary fan defines a primary fan corrected tip speed during operation of the gas turbine engine at the rated speed during standard day operating conditions, wherein the secondary fan defines a secondary fan corrected tip speed during operation of the gas turbine engine at the rated speed during standard day operating conditions, wherein the primary fan corrected tip speed is between 600 feet per second and 1,800 feet per second, and wherein the secondary fan corrected tip speed is between 1,200 feet per second and 1,800 feet per second.

14. The gas turbine engine of claim 1, wherein the fan duct flowpath defines an outlet, and wherein the gas turbine engine further comprises:
a variable geometry component associated with the secondary fan, wherein the variable geometry component is a stage of variable inlet guide vanes located immediately upstream of the secondary fan, a variable exhaust nozzle located at the outlet of the fan duct flowpath, or both.

15. The gas turbine engine of claim 1, wherein the gas turbine engine defines a bypass airflow passage, wherein the primary fan is configured to provide a first portion of a primary fan airflow to the bypass airflow passage and a second portion of the primary fan airflow to the secondary fan, and wherein the secondary fan is configured to provide a first portion of a secondary fan airflow to the fan duct flowpath as the fan duct airflow and a second portion of the secondary fan airflow to the working gas flowpath.

16. The gas turbine engine of claim 1, further comprising:
a heat exchanger positioned in thermal communication with the fan duct flowpath.

17. The gas turbine engine of claim 1, further comprising:
an array of inlet guide vanes located immediately upstream of the secondary fan; and
an array of outlet guide vanes located immediately downstream of the secondary fan and upstream of the fan duct.

18. The gas turbine engine of claim 1, further comprising:
a fan cowl surrounding the secondary fan located downstream of the primary fan, the fan cowl defining in part an engine inlet located downstream of the primary fan;
wherein the turbomachine further comprises a core cowl surrounding at least in part the compressor section, the combustion section, and the turbine section, and wherein the fan duct is defined between the core cowl and the fan cowl.

19. A gas turbine engine defining a centerline and a circumferential direction, the gas turbine engine comprising:
a turbomachine comprising a compressor section, a combustion section, and a turbine section arranged in serial flow order, the turbomachine comprising an inlet splitter defining in part an inlet to a working gas flowpath and a fan duct splitter defining in part an inlet to a fan duct flowpath;
a primary fan driven by the turbomachine defining a primary fan tip radius $R_1$, a primary fan hub radius $R_2$, and a primary fan specific thrust rating $T_P$;
an array of guide vanes located downstream of the primary fan; and
a secondary fan located downstream of the primary fan and driven by the turbomachine, at least a portion of an airflow from the primary fan configured to bypass the secondary fan, the secondary fan defining a secondary fan tip radius $R_3$, a secondary fan hub radius $R_4$, and a secondary fan specific thrust rating $T_S$,
wherein the gas turbine engine defines an Effective Bypass Area (EBA), and wherein a ratio of $R_1$ to $R_3$ equals $$\frac{R_1}{R_3} = \sqrt{(EFP)\frac{(1-RqR^2_{(Sec.-Fan)})}{(1-RqR^2_{Prim.-Fan})}\left(\frac{T_P}{T_S}\right)(EBA)},$$

and wherein EFP is between 0.15 and 33, wherein $RqR_{Prim.-Fan}$ is a ratio of $R_2$ to $R_1$, wherein $RqR_{Sec.-Fan}$ is a ratio of $R_4$ to $R_3$, wherein the primary fan specific thrust rating $T_P$ is between 0.08 and 0.59, wherein the secondary fan specific thrust rating $T_S$ is between 0.21 and 0.6, and wherein the Effective Bypass Area (EBA) is between 0.2% and 15%.

\* \* \* \* \*